(12) United States Patent
Kassas et al.

(10) Patent No.: US 12,401,558 B2
(45) Date of Patent: Aug. 26, 2025

(54) SYSTEMS AND METHODS FOR OPPORTUNISTIC TIME OF ARRIVAL ESTIMATION FOR OPPORTUNISTIC LOCALIZATION WITH 5G SIGNALS

(71) Applicant: The Regents of the University of California, Oakland, CA (US)

(72) Inventors: Zak Kassas, Irvine, CA (US); Kimia Shamaei, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 491 days.

(21) Appl. No.: 17/926,000

(22) PCT Filed: May 18, 2021

(86) PCT No.: PCT/US2021/032972
§ 371 (c)(1),
(2) Date: Nov. 17, 2022

(87) PCT Pub. No.: WO2022/026034
PCT Pub. Date: Feb. 3, 2022

(65) Prior Publication Data
US 2023/0171142 A1 Jun. 1, 2023

Related U.S. Application Data

(60) Provisional application No. 63/026,360, filed on May 18, 2020.

(51) Int. Cl.
*H04L 27/26* (2006.01)
*H04L 5/00* (2006.01)
*H04W 56/00* (2009.01)

(52) U.S. Cl.
CPC ........ *H04L 27/265* (2013.01); *H04L 27/2662* (2013.01); *H04W 56/001* (2013.01)

(58) Field of Classification Search
None
See application file for complete search history.

(56) References Cited

U.S. PATENT DOCUMENTS 10,212,679 B1 * 2/2019 Suresh ............... H04L 25/0224
2018/0368084 A1 12/2018 Ko et al.
(Continued)

OTHER PUBLICATIONS

International Search Report, International Application No. PCT/US21/32972, Mailing Date: Mar. 4, 2022, 3 Pages.

*Primary Examiner* — Duc T Duong
(74) *Attorney, Agent, or Firm* — John P. Teresinski; Stites & Harbison, PLLC

(57) ABSTRACT

Processes and device configurations are provided for extracting observables from communications signals. Methods include performing a frequency extraction on received communication signals to determine a carrier frequency, acquiring an estimation of channel frequency response and a frame start time. Signal tracking is performed to update frame start time of a signal physical broadcast channel block structure (SS/PBCH) in the communication signal, and at least one observable is extracted from the communications signal based on the updated estimate of frame start time. Characteristics of communications signal, such as frame structure including a synchronization signal physical broadcast channel block structure (SS/PBCH) may be used to opportunistically extract time of arrival (TOA) from communications signals. Symbols and subcarriers of new radio signals may be used to extract reference signals, and to determine one or more navigation observables based on communication signal.

20 Claims, 17 Drawing Sheets

(56) References Cited

U.S. PATENT DOCUMENTS

| | | |
|---|---|---|
| 2019/0045559 A1 | 2/2019 | Huang et al. |
| 2019/0159148 A1 | 5/2019 | Jung et al. |
| 2020/0025859 A1 | 1/2020 | Kassas et al. |
| 2021/0067298 A1* | 3/2021 | Si .......................... H04L 5/0048 |
| 2021/0127283 A1* | 4/2021 | Si .......................... H04W 24/08 |
| 2022/0225372 A1* | 7/2022 | Kim ...................... H04L 1/0072 |
| 2022/0232496 A1* | 7/2022 | Kim ...................... H04L 5/0053 |
| 2022/0353807 A1* | 11/2022 | He ........................ H04W 48/20 |
| 2024/0064669 A1* | 2/2024 | Grant .................... H04W 48/12 |

\* cited by examiner

SYSTEMS AND METHODS FOR OPPORTUNISTIC TIME OF ARRIVAL ESTIMATION FOR OPPORTUNISTIC LOCALIZATION WITH 5G SIGNALS

CROSS REFERENCE TO RELATED APPLICATION

This application is the National Stage entry under 35 U.S.C. § 371 of International Application No. PCT/US2021/032972, filed May 18, 2021, which claims priority to U.S. provisional application No. 63/026,360 titled SYSTEMS AND METHODS FOR OPPORTUNISTIC NAVIGATION WITH 5G SIGNALS filed on May 18, 2020, the content of which is expressly incorporated by reference in its entirety.

STATEMENT OF GOVERNMENT SUPPORT

This invention was made with Government support under Grant No. N00014-19-1-2511 awarded by the Office of Naval Research. The Government has certain rights in the invention.

FIELD

The present disclosure generally relates to opportunistic navigation and to signal structures for opportunistic navigation, coding and decoding procedures, ranging and position accuracy and extraction of navigation observables.

BACKGROUND

Autonomous ground vehicles (AGVs), such as self-driving cars, already navigate streets and roadways in several cities around the world. By 2018, over one million miles of self-driving car use was reported. AGVs promise to offer higher quality of life by reducing the number accidents and reducing countless hours of wasted time. However, this is only achievable with reliable autonomy. One important factor to evaluate the reliability of an AGV is called disengagement rate, which is defined based on the California Department of Motor Vehicles (DMV) as the number of times the AGVs test driver has to disengage the autonomous mode and to take immediate manual control of the vehicle. Although several top tier performing AGVs, have reported low disengagement rates, AGVs are a long way from reliable and full-time autonomy.

Situational awareness is key to achieving reliable and full-time autonomy. One of the key enablers is vehicle-to-everything (V2X) communication, which includes communication between a vehicle with at least one of other vehicles, pedestrians, infrastructure, and networks. In 2009, the United States assigned an IEEE 802.11p-based dedicated short range communication (DSRC) technology to vehicle-to-vehicle (V2V) communication over a pre-specified transmission band to ensure low interference. Although DSRC has been tested over large-scale trials over the past years for V2V transmissions, it has failed to answer the demands for vehicle-to-network (V2N) and vehicle-to-infrastructure (V2I) due to low transmission bandwidth and lack of proper roadside units. To overcome the limitations of DSRC, the third generation partnership project (3GPP) has developed a cellular based V2X communication in Release 15 and 16 for the 5th generation (5G) of wireless access technology (also known as new radio (NR)).

Low latency and high data rate are among the main characteristics of NR signals. To achieve these characteristics, higher transmission bandwidth is essential. However, unlicensed spectrum in lower frequencies is scarce. Due to this limitation, using millimeter waves (mmWaves) for NR signal transmission has been considered. The mmWaves suffer from high signal path loss, which can be compensated by beamforming techniques and massive multiple-input multiple-output (mMIMO) antenna structure. However, beamforming requires the knowledge of user location. 5G-based technologies are a key enabler to high data rates via proactive resource allocation and beamforming.

The 3GPP has evaluated different types of positioning techniques including timing, angle, carrier phase, and received reference signal power-based techniques for NR downlink and uplink signals in Release 15 and 16. Positioning performance evaluation of 5G signals is not only limited to 3GPP reports. For example, mmWaves signals' characteristics were evaluated for positioning in literature. Position and orientation error bounds were derived as a function of the Cramer-Rao lower bounds (CRLBs) of the direction-of-departure (DOD), direction-of-arrival (DOA), and time-of-arrival (TOA) for both uplink and downlink communications. A methodology to design 5G networks for precise positioning has been proposed and was evaluated with simulation results. Several channel estimation algorithms were proposed to estimate DOD, DOA, and TOA of the user equipment (UE) by means of compressed sensing tools, which exploit the sparsity of mm-Wave channels. The received reference signal strength from multiple base stations was used to estimate the DOD and position of the UE in a two-stage Kalman filter. In addition, a method was proposed to jointly estimate the position and orientation of the UE, as well as the location of reflectors or scatterers in the absence of the line-of-sight (LOS) path. To remove the effect of the clock bias, a two-way localization approach was proposed and its position and orientation error bounds were derived.

All the proposed approaches in the literature for NR signal use require a pre-specified reference signal transmission, namely positioning reference signal (PRS), where cellular providers must allocate additional bandwidth to the PRS transmission. In addition, the aforementioned algorithms require prior knowledge of the systems' parameters (e.g., number of transmission antennas and beamforming matrix), which are not available to a receiver in practical applications. Therefore, a network-based positioning approach must be used, which compromises the privacy. There is a need for opportunistic navigation with NR signals, where NR reference signals that are broadcast to the UE are exploited for navigation purposes.

Over the past decade, opportunistic navigation has been demonstrated in the literature with different types of radio frequency (RF) signals, also known as signals of opportunity (SOPs). SOP examples include cellular, digital television, AM/FM, Wi-Fi, and low-earth orbit (LEO) satellite signals. Among SOPs, cellular signals have attracted considerable attentions due to their desirable attributes, including: (1) large transmission bandwidth, (2) high carrier-to-noise ratio (C/N0), and (3) favorable geometric diversity. The potential of using cellular code-division multiple access (CDMA) and long-term evolution (LTE). CDMA and LTE are the standards of the 3rd and 4th generations (3G and 4G) of wireless communication systems, respectively. Operators have started implementing new standards. There is a desire for systems and methods configured to use communications signals, such as new radio signals including 5G communications, to aide navigation operations.

BRIEF SUMMARY OF THE EMBODIMENTS

Disclosed and described herein are systems, methods and configurations for extracting observables from communications signals. In one embodiment, a method includes receiving, by a device, a communication signal the communication signal transmitted with a frame structure including a synchronization signal physical broadcast channel block structure (SS/PBCH), and performing, by the device, a frequency extraction on the received communication signal to determine carrier frequency of the communication signal. The method includes acquiring, by the device, an estimation of the channel frequency response and a frame start time by removing the carrier frequency of the communication signal to generate samples of the communication signal into a baseband domain, converting the samples of the communication signal in a baseband domain to frame structure components, and extracting a signal physical broadcast channel block structure (SS/PBCH) from the frame structure components to estimate channel frequency response (CFR) and frame start time of the signal physical broadcast channel block structure (SS/PBCH) in the communication signal. The method also includes performing, by the device, signal tracking to update frame start time of the signal physical broadcast channel block structure (SS/PBCH) in the communication signal. The method also includes extracting, by the device, at least one observable from the communications signal based on the updated estimate of frame start time of the signal physical broadcast channel block structure (SS/PBCH) in the communication signal.

In one embodiment, the communication signal is based on orthogonal frequency division multiplexing (OFDM) modulation with a cyclic prefix (CP).

In one embodiment, performing frequency extraction includes finding at least one synchronization channel raster frequency associated with a signal physical broadcast channel block structure (SS/PBCH) center frequency.

In one embodiment, acquiring an estimate of channel frequency response includes extraction of a synchronization signal physical broadcast channel block structure from the communications signal.

In one embodiment, the frame structure includes a primary synchronization signal (PSS) to provide symbol timing and a secondary synchronization signal (SSS) to provide frame timing, wherein samples of the communication signal in the baseband are correlated to PSS sequences to determine SS/PBCH symbol start time.

In one embodiment, converting the samples of the communication signal in a baseband domain removes a cyclic prefix (CP) and includes performing a fast Fourier Transform (FFT) to construct OFDM symbols of a frame of the signal.

In one embodiment, estimating channel frequency response (CFR) and frame start time of the signal physical broadcast channel block structure (SS/PBCH) in the communication signal includes using a demodulation reference signal (DM-RS) to estimate the CFR and decoding a physical broadcast channel message of the frame structure.

In one embodiment, signal tracking includes using a tracking loop structure including a phase-locked loop (PLL)-aided delay-locked loop (DLL), the tracking loop structure configured to perform discriminator function, a low-pass filter (LPF), and a numerically-controlled oscillator (NCO).

In one embodiment, signal tracking includes a discriminator function to determine normalized timing error.

In one embodiment, extracting at least one observable from the communications signal includes determining at least one of time of arrival of the communication signal and pseudorange measurement for the device.

Another embodiment is directed to a device configured for extracting observables from a communications signal. The device includes a communications module configured to receive a communication signal, the communication signal transmitted with a frame structure including a synchronization signal physical broadcast channel block structure (SS/PBCH). The device also includes a controller, coupled to the communications module, wherein the controller is configured to perform a frequency extraction on the received communication signal to determine a carrier frequency of the communication signal. The controller is configured to acquire an estimation of the channel frequency response and a frame start time by removing the carrier frequency of the communication signal to generate samples of the communication signal into a baseband domain, converting the samples of the communication signal in a baseband domain to frame structure components, and extracting a signal physical broadcast channel block structure (SS/PBCH) from the frame structure components to estimate channel frequency response (CFR) and frame start time of the signal physical broadcast channel block structure (SS/PBCH) in the communication signal. The controller is also configured to perform signal tracking to update frame start time of the signal physical broadcast channel block structure (SS/PBCH) in the communication signal. The controller is also configured to extract at least one observable from the communications signal based on the updated estimate of frame start time of the signal physical broadcast channel block structure (SS/PBCH) in the communication signal.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
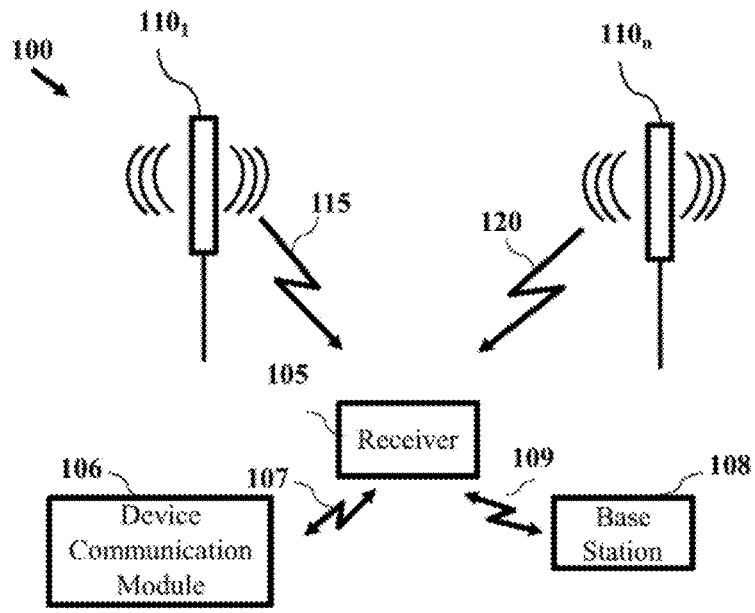
FIG. 1 is a graphical representation of opportunistic navigation according to one or more embodiments.

One aspect of the disclosure is directed to opportunistic navigation. In one embodiment, processes and configurations are provided for use of signal parameters and signal structures, such as cellular communication signals, to aid in navigation. Processes and configurations are provided herein may leverage one or more communication signal features. According to embodiments, processes and configurations are provided to decode new radio (NR) signals, such as cellular based communication signals, cellular V2X communication, and $5^{th}$ Generation (5G) wireless access signals. Use of communication signals not intended for navigation may relate to opportunistic navigation, wherein downlink broadcasts from transmitters may be used without interference to communication of the transmitting stations. It should be appreciated that the principles of the disclosure may be used with other communication signals and is not limited to New radio or 5G communication signals. As described herein, the methods are provided to receive a communications signals transmitted with frame structures and for use of the transmissions to determine navigation observables.

According to embodiments, systems, methods and configurations are provided for extracting observables from communications signals. In one embodiment, a method includes receiving, by a device, a communication signal, and performing, by the device, a frequency extraction on the received communication signal to determine carrier frequency of the communication signal. The method includes acquiring, by the device, an estimation of the channel frequency response and a frame start time, and performing, by the device, signal tracking to update an estimated time of arrival (TOA) of the communication signal. The method also includes extracting, by the device, at least one observable from the communications signal based on the updated estimate of TOA.

According to embodiments, systems and processes are provided for navigation using new radio or communication signals relative to one or more signal structure parameters. Downlink new radio signals may be decoded to received transmitted reference frequencies to aid in navigation, vehicle sensing, vehicle communication, etc.

One or more solutions are provided to utilize symbols and subcarriers of new radio signals to extract reference signals encoded in a new radio signal, and to determine one or more navigation observables based on communication signal. According to embodiments, a signal physical broadcast channel block structure (SS/PBCH) may be extracted and/or decoded from the frame structure components to estimate channel frequency response (CFR) and frame start time of the signal physical broadcast channel block structure (SS/PBCH) in the communication signal.

Embodiments are directed to devices and systems configured for extracting observables from communications signals. Device configurations may be configured to perform one or more processes described herein.

One embodiment is directed to a receiver structure and receiver processes. The receiver structure may be configured to extract carrier frequency of a new radio signal, acquire an estimation of a channel frequency response, and perform signal tracking. System configurations may employ one or more devices to perform receiver operations described herein. The configurations and processes described herein may be employed for opportunistic navigation. In addition, one or more operations for signal structures for opportunistic navigation are provided including coding and decoding procedures, ranging, position accuracy, and extraction of navigation observables.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

FIG. 1 is a graphical representation of opportunistic navigation according to one or more embodiments. According to one embodiment, a signal structure is provided to allow for opportunistic navigation using communication signals. Signals of communication network 100 may relate to one or more communication signals, such as cellular communication signals, vehicle-to-vehicle communication signals, vehicle-to-infrastructure and/or vehicle-to-network. Embodiments are also provided to describe a structure of signals of communication network 100 and for configurations of network entities, such as receiver 105, device communication module 106, antenna elements $110_{1-n}$ and base station 108. Processes and configurations described herein may leverage one or more communication signal features, and characteristics of communication network 100 for opportunistic navigation.

As shown in FIG. 1, communication network 100 includes a plurality of antenna elements $110_{1-n}$ configured to transmit signals 115, 120. Receiver 105 may be configured to receive downlink transmissions, such as signals 115 and 120 from antenna elements $110_{1-n}$. Downlink transmissions received by received 105 may relate to one or more communication signals, such as new radio signals. Receiver 105 may also communicate with device communication module 106 by way of signals 107 and base station 108 by way of signals 109. According to one embodiment, processes and configurations are provided for new radio (NR) signals, such as cellular based communication signals, cellular V2X communication, and $5^{th}$ Generation (5G) wireless access signals, to be employed by a device, such as receiver 105, for opportunistic navigation. As used herein, opportunistic navigation may relate to using communication signals, which are non-positioning signals, to aid in navigation and/or one or more navigation operations. In addition, opportunistic navigation functions described herein may be applied to one or more autonomous vehicles, such as autonomous ground vehicles. Receiver 105 may be a component of an autonomous vehicle.

According to one embodiment, configurations and processes are provided for a receiver, such as receiver 105, to determine its position and/or provide observables to aid in vehicle operation. Observables may relate to one or more of a time of arrival (TOA) of a received communication signal, psuedorange determination, and position estimate for a device associated with a receiver. In certain embodiments, receiver 105 may be configured to determine one or more observables from opportunistic signals received from another device, such as signals 107 from device communication module 106 or, similarly signals 109 from base station 108. Device communication module 106 may relate to a device that is part of a vehicle-to-vehicle network. Base station 108 may relate to a fixed position device part of a vehicle-to-infrastructure network. One or more components of system 100 may be part of a vehicle-to-everything network. According to another embodiment, receiver 105 may be part of user equipment (UE).

Figure 2:
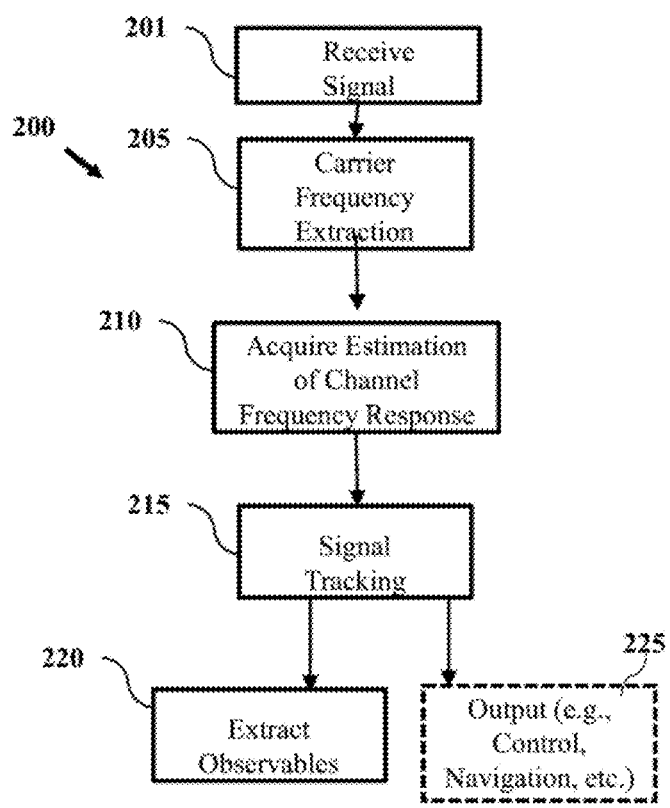
FIG. 2 illustrates a process for extracting one or more observables from communications signals according to one or more embodiments.

FIG. 2 illustrates a process for acquisition of one or more observables from communications signals according to one or more embodiments. Process 200 may be employed by a device, such as receiver 105, to determine one or more of time of arrival of a communication signal, a position estimate, and observables to aid in navigation.

Process 200 may include receiving a communication signal at block 201. According to embodiments, process 200 may be initiated by a receiver (e.g., receiver 105) detecting one or more signals of opportunity, such as NR signals, at block 201. The communication signal may be transmitted with a frame structure including a synchronization signal physical broadcast channel block structure (SS/PBCH). The received communication signal at block 201 may be based on orthogonal frequency division multiplexing (OFDM) modulation with a cyclic prefix (CP). According to embodiments, the frame structure includes a primary synchronization signal (PSS) to provide symbol timing and a secondary synchronization signal (SSS) to provide frame timing, wherein samples of the communication signal in the baseband are correlated to PSS sequences to determine SS/PBCH symbol start time. As discussed below with reference to FIG. 4, characteristics and elements of a communication signal framework may be leveraged to determine observables even if the signal is not transmitted for the purpose of providing a navigation observable. Process 200 may be performed by a receiver (e.g., receiver 105) performing carrier frequency extraction from one or more received signals, such as transmissions of a new radio (NR) signal, at block 205. If a receiver knows the subcarrier frequency of a synchronization signal physical broadcast channel block structure (SS/PBCH) block, frequency extraction at block 205 may be skipped.

At block 201, one or more signals of opportunity may be detected. Process 200 may include selection of at least one signal of opportunity for acquisition at block 201. Similarly, process 200 may include selection of signals of opportunity based on a particular downlink transmission type, such as a NR signal. According to embodiments, process 200 may include performing position estimates on each received signal of opportunity. According to embodiments, the signal of opportunity may be a downlink transmission including one or more symbols, such as an OFDM symbol. Although new radio (NR) signals are discussed with respect to FIG. 2, it should be appreciated that the processes described herein may be applied to other communication signals.

Figure 6:
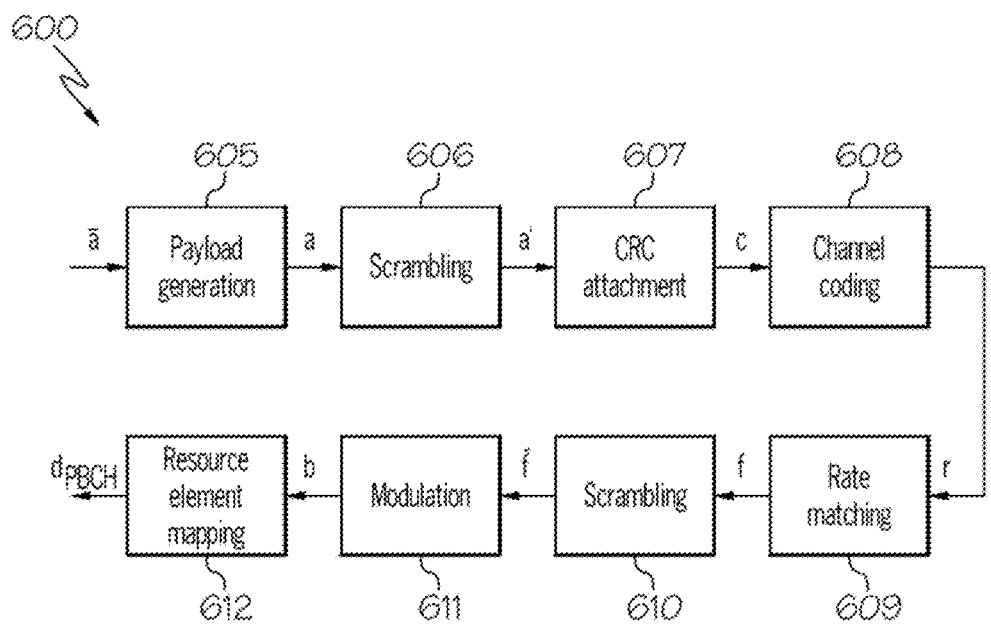
FIG. 6 illustrates physical broadcast channel coding block diagram according to one or more embodiments.

At block 205, carrier frequency of the communication signal may be determined. Performing frequency extraction can include finding at least one synchronization channel raster frequency associated with a signal physical broadcast channel block structure (SS/PBCH) center frequency. As discussed in section II(A) below, SS/PBCH blocks may be present in specified channel raster. FIG. 6 describes physical broadcast channel (PBCH) coding. Process 200 may be configured to decode and extract signals including a PBCH coding format.

Process 200 may include a receiver configured to acquire estimation of a channel frequency response at block 210 and perform signal tracking at block 215. At block 210, an estimation of the channel frequency response and a frame start time may be acquired by removing the carrier frequency of the communication signal to generate samples of the communication signal into a baseband domain. The samples of the communication signal in a baseband domain may be converted to frame structure components. Converting the samples of the communication signal in a baseband domain removes a cyclic prefix (CP) and includes performing a fast Fourier Transform (FFT) to construct OFDM symbols of a frame of the signal.

Acquiring an estimate of channel frequency response at block 210 may also include includes extraction of a synchronization signal physical broadcast channel (SS/PBCH) block structure from the communications signal to estimate channel frequency response (CFR) and frame start time of the signal physical broadcast channel block structure (SS/PBCH). The PBCH block may be decoded for extraction of one or more reference signals. In one embodiment, acquiring an estimate of channel frequency response includes extraction of a synchronization signal physical broadcast channel block structure from the communications signal. According to embodiments, estimating channel frequency response (CFR) and frame start time of the signal physical broadcast channel block structure (SS/PBCH) in the communication signal includes using a demodulation reference signal (DM- RS) to estimate the CFR and decoding a physical broadcast channel message of the frame structure. As will be discussed below with reference to acquisition of a receiver, the NR signal may be decoded in order to decode a PBCH block. Acquisition may result in a coarse estimation of Doppler frequency and TOA. Process 200 may include one or more operations at block 210 associated with acquisition stage operations described below in connection with FIG. 7.

At block 215, process 200 includes performing signal tracking. In one embodiment a signal tracking loop is employed including a phase-locked loop (PLL)-aided delay-locked loop (DLL). In certain embodiments, the phase locked loops may relate to software defined radio operations performed by a controller and/or processor. Signal tracking at block 215 can update a determination and/or estimate of a frame start time of the signal physical broadcast channel block structure (SS/PBCH) in the communication signal. According to embodiments, signal tracking includes using a tracking loop structure including a phase-locked loop (PLL)-aided delay-locked loop (DLL), the tracking loop structure configured to perform discriminator function, a low-pass filter (LPF), and a numerically-controlled oscillator (NCO). According to another embodiment, signal tracking includes a discriminator function to determine normalized timing error. Process 200 may include one or more operations at block 215 associated with tracking stage operations described below in connection with FIG. 8.

At block 220, process 200 includes extracting one or more observables. According to embodiments, extracting at least one observable from the communications signal is based on the updated estimate of frame start time of the signal physical broadcast channel block structure (SS/PBCH) in the communication signal. Extracting at least one observable from the communications signal includes determining at least one of time of arrival (TOA) of the communication signal and pseudorange measurement for the device. TOA determined at block 220 may be the time of arrival for a communication signal to a receiver device from a transmitter (e.g., next generation NodeBs (gNB)). Location determinations for a device may be based on refined TOA, for example a pseudo range measurements position estimates, etc.

At block 225, process 200 may optionally output one or more of determined position data and/or control outputs for navigation based on determined position. A device associated with a receiver may be configured to control navigation using the location determined for the device.

Figure 3:
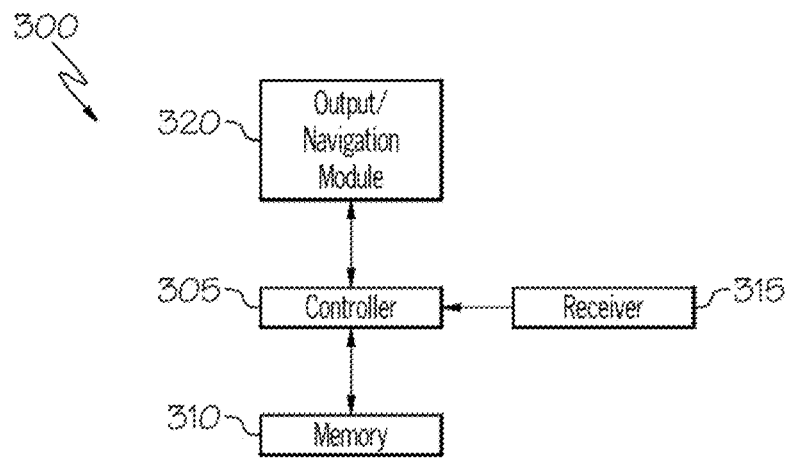
FIG. 3 depicts a device configuration according to one or more embodiments.

FIG. 3 depicts a device configuration according to one or more embodiments. Device 300 may relate to a receiver or components of a vehicle configured to receive signals of opportunity such as new radio signals. Device 300 is configured to extract observables from communications signals. According to one embodiment, device 300 includes controller 305, memory 310 and receiver 315. Device 300 may optionally include an output/navigation module 320.

Controller 305 may relate to a processor or control device configured to execute one or more operations stored in memory 310, such as estimation of channel frequency response and channel tracking. Controller 305 may be coupled to memory 310 and receiver 315. Receiver 315 may be a communications module configured to receive one or more communication signals, including new radio signals. In certain embodiments, receiver 315 may be configured to include one or more software defined radio elements to acquire and track transmitted signals. According to one embodiment, controller 305 may be configured to determine a position of device 300 based on tracking loop estimates of TOA. Position determinations and/or observables may be used to output navigation commands or operate a device by way of optional output/navigation module 320.

Receiver 315 may be a communications module (e.g., device communications module 106) configured to receive a communication signal, the communication signal transmitted with a frame structure including a synchronization signal physical broadcast channel block structure (SS/PBCH). Controller 305 is coupled to receiver 315, the communications module of device 300.

According to embodiments, controller 305 is configured to perform a frequency extraction on the received communication signal to determine a carrier frequency of the communication signal. Controller 305 is configured to acquire an estimation of the channel frequency response and a frame start time by removing the carrier frequency of the communication signal to generate samples of the communication signal into a baseband domain, converting the samples of the communication signal in a baseband domain to frame structure components, and extracting a signal physical broadcast channel block structure (SS/PBCH) from the frame structure components to estimate channel frequency response (CFR) and frame start time of the signal physical broadcast channel block structure (SS/PBCH) in the communication signal. Controller 305 is also configured to perform signal tracking to update frame start time of the signal physical broadcast channel block structure (SS/PBCH) in the communication signal. Controller 305 is also configured to extract at least one observable from the communications signal based on the updated estimate of frame start time of the signal physical broadcast channel block structure (SS/PBCH) in the communication signal.

Receiver 315 may be configured to acquire and track signals from one or more antenna sources transmitting NR and cellular signals. Although NR signals are discussed herein, it should be appreciated that the processes described herein may be applied to other signals of opportunity. Acquisition and tracking of a signal of opportunity may be performed using at least one signal format. As discussed below, acquisition of an orthogonal frequency division (OFDM) signal used to transmit data may include obtaining one or more signal parameters of the transmitted signal in order to determine a position of the device relative to the transmission source.

Embodiments of the disclosure, including methods, device configurations and systems may be configured to opportunistically leverage signals not transmitted for the purpose of navigation, such as NR signals. Characterizations of NR signals and use by embodiments are described below.

I. New Radio (NR) Signal Structure

According to one or more embodiments, operations and device configurations described herein may be based on characteristics of communication signals. Low-level models are described for NR signals and a frame structure is provided. One or more processes and device configurations described herein may be utilize frame structure described. Operations and processes described herein may leverage characteristics for use in navigation.

Figure 4:
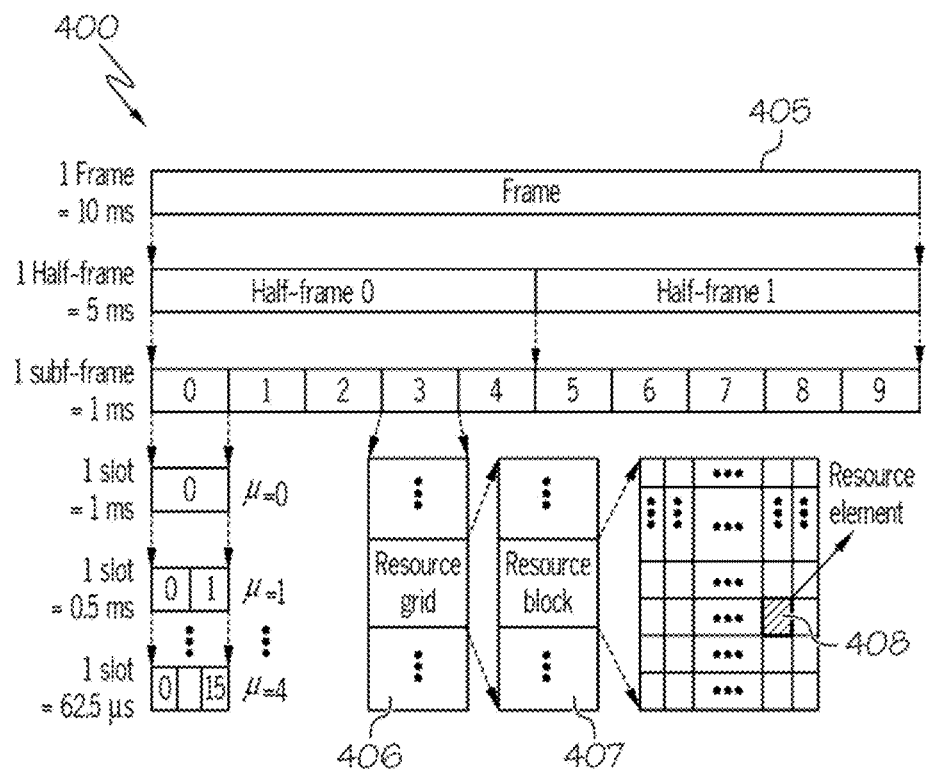
FIG. 4 illustrates a graphical representation of communications signal framework according to one or more embodiments.

FIG. 4 illustrates a graphical representation of communications signal framework according to one or more embodiments.

A. NR Frame Structure

NR downlink transmissions may be based on orthogonal frequency division multiplexing (OFDM) modulation with cyclic prefix (CP). Frame structure 400 includes an NR frame 405 may have a duration of 10 ms and include 10 subframes with durations of 1 ms. A frame can also be decomposed into two half-frames, where subframes 0 to 4 form half-frame 0 and subframes 5 to 9 form half-frame 1. This structure enables the coexistence of LTE and NR systems.

In the time-domain, each subframe breaks down into numerous slots, each of which contains 14 OFDM symbols for a normal CP length. The number of slots per subframe depends on the subcarrier spacing. In contrast to LTE, which has a constant subcarrier spacing of 15 kHz, NR can define different numerologies $\mu \in \{0, \ldots, 4\}$ to support flexible subcarrier spacing $\Delta f = 2^\mu \cdot 15$ [kHz]. As a result, there are $2^\mu$ slots in each subframe and the CP is down-scaled by a factor of $2^\mu$ compared to the LTE signal's CP length. Subcarrier spacings of 15 and 30 kHz are more suitable for FR1 since the signal's attenuation is lower and the cell size can be larger, while higher subcarrier spacings are more applicable to FR2.

In the frequency-domain, each subframe is divided into numerous resource grids, shown as 406, each of which has multiple resource blocks, shown as 407, with 12 subcarriers. The number of resource grids in the frame is provided to a receiver device (such as user equipment (UE)) from higher level signaling. A resource element 408 is the smallest element of a resource grid that is defined by its symbol and subcarrier number.

B. NR SS/PBCH Block

When a device (e.g., UE) receives an NR signal, it must first convert the signal into the frame structure to be able to extract the transmitted information. According to one embodiment, this is achieved by first identifying the frame start time. Then, knowing the frame start time, the device can remove the cyclic prefixes (CPs) and take a fast Fourier transform (FFT) to construct all the OFDM symbols in the frame.

To provide frame timing to a device (e.g., UE), a gNB broadcast synchronization signal (SS) on pre-specified symbol numbers, which are known at the device. The device can obtain frame start time by acquiring the SS. An SS includes a primary synchronization signal (PSS) and a secondary synchronization signal (SSS), which provide symbol and frame timing, respectively.

The PSS and SSS are transmitted along with the physical broadcast channel (PBCH) signal and its associated demodulation reference signal (DM-RS) on a block called SS/PBCH block. The SS/PBCH block consists of four consecutive OFDM symbols and 240 consecutive subcarriers.

Figure 5:
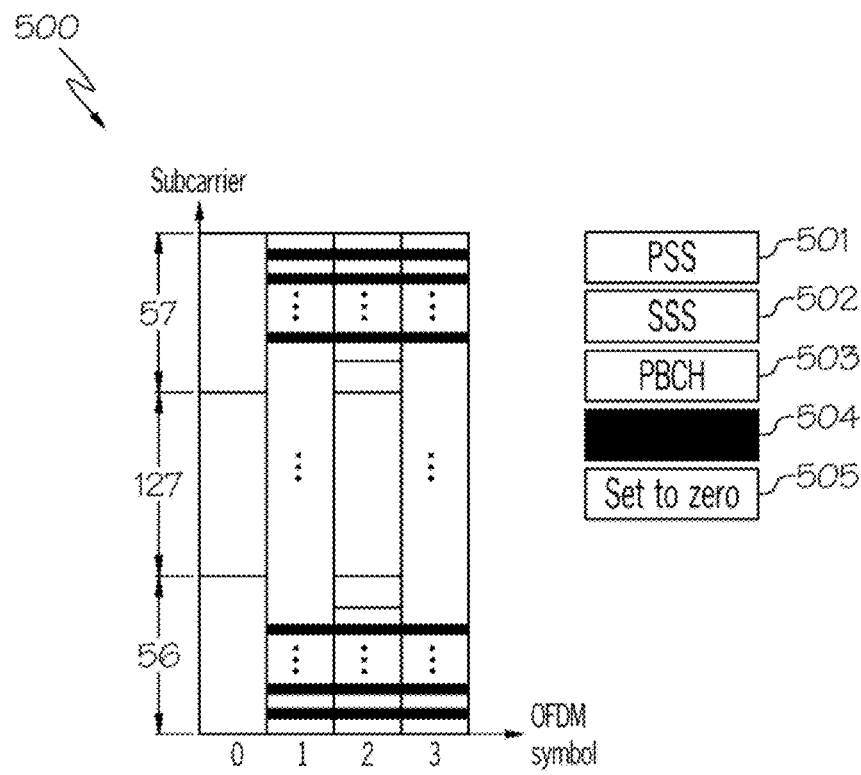
FIG. 5 illustrates a synchronization signal physical broadcast channel block structure according to one or more embodiments.

FIG. 5 illustrates a synchronization signal physical broadcast channel block structure (SS/PBCH) according to one or more embodiments. SS/PBCH block structure 500 and Table I show the subcarriers and symbols allocated to each symbol in the SS/PBCH block. SS/PBCH block structure 500 includes PSS 501, SSS 502, PBCH 503, DM-RS 504 and set to zero 505.

TABLE I

SYMBOL AND SUBCARRIER NUMBERS IN AN SS/PBCH BLOCK

| Signal type | Symbol number | Subcarrier number |
|---|---|---|
| PSS | 0 | 56, 57, . . . , 182 |
| SSS | 0 | 56, 57, . . . , 182 |
| Set to zero | 0 | 0, 1, . . . , 55, 183, 184, . . . , 239 |
|  | 2 | 48, 49, . . . , 55, 183, 184, . . . , 191 |

TABLE I-continued

SYMBOL AND SUBCARRIER NUMBERS IN AN SS/PBCH BLOCK

| Signal type | Symbol number | Subcarrier number |
|---|---|---|
| PBCH | 1, 3 | 0, 1, . . . , 239 |
|  | 2 | 0, 1, . . . 47, 192, 193, . . . , 239 |
| DMRS | 1, 3 | 0 + v, 4 + v, . . . , 236 + v |
|  | 2 | 0 + v, 4 + v, . . . , 44 + v 192 + v, 196 + v, . . . , 236 + v |

Note:
$v = N_{ID}^{Cell} \bmod 4$

The frequency location of the SS/PBCH block depends on the NR high-level signaling. The SS/PBCH block has a periodicity of 20 ms and is transmitted numerous times on one of the half frames, which is also known as SS/PBCH burst. Each SS/PBCH block is transmitted in a different direction using beamforming techniques.

The OFDM symbol numbers on which the SS/PBCH block starts and the number of SS/PBCH blocks per frame depend on the numerology and transmission frequency fc of the signal. Table II summarizes these values. Index 0 in this table represents the first symbol of the half frame containing SS/PBCH blocks. Note that in the 5G protocol, SS/PBCH is not transmitted on subcarrier spacing of 60 kHz.

TABLE II

SYMBOL NUMBERS CONTAINING SS/PBCH BLOCK FOR DIFFERENT NUMEROLOGIES AND FREQUENCY BANDS

| subcarrier spacing (kHz) | Carrier frequency | Symbol number | Slot number n |
|---|---|---|---|
| Case A: 15 | $f_c \leq 3$ GHz | $\{2, 8\} + 14n$ | $\{0, 1\}$ |
|  | $3 < f_c \leq 6$ GHz |  | $\{0, \ldots, 3\}$ |
| Case B: 30 | $f_c \leq 3$ GHz | $\{4, 8, 16, 20\} + 28n$ | $\{0\}$ |
|  | $3 < f_c \leq 6$ GHz |  | $\{0, 1\}$ |
| Case C: 30 | $f_c \leq 3$ GHz | $\{2, 8\} + 14n$ | $\{0, 1\}$ |
|  | $3 < f_c \leq 6$ GHz |  | $\{0, \ldots, 3\}$ |
| Case D: 120 | $f_c > 6$ GHz | $\{4, 8, 16, 20\} + 28n$ | $\{0, \ldots, 3, 5, \ldots, 8, 10, \ldots, 13, 15, \ldots, 18\}$ |
| Case E: 240 | $f_c > 6$ GHz | $\{8, 12, 16, 20, 32, 36, 40, 44\} + 56n$ | $\{0, \ldots, 8\}$ |

C. PSS and SSS Sequence Generation

The PSS and SSS are two orthogonal maximum-length sequences (m-sequences) of length) $N_{ss}=127$, which are transmitted on contiguous subcarriers. The PSS is transmitted in one form of three possible sequences, each of which maps to an integer representing the sector ID of the gNB, i.e., $N_{ID}^{(2)} \in \{0, 1, 2\}$. The SSS is transmitted in one of 336 possible forms, each of which maps to an integer representing the gNB's group identifier, i.e., $N_{ID}^{(1)} \in \{0, \ldots, 335\}$. The values of $N_{ID}^{(2)}$ and $N_{ID}^{(1)}$ define the physical cell identity of the gNB according to $$N_{ID}^{Cell} = 3N_{ID}^{(1)} + N_{ID}^{(2)}.$$

D. PBCH Sequence Generation

PBCH is a physical channel to transmit essential system information for establishing a connection between the gNB and UE. These parameters are sent in a block called master information block (MIB). An MIB is a 23 bits message containing: (1) frame number (6 bits), (2) subcarrier spacing (1 bit) (this bit shows subcarrier spacing of 15 or 30 kHz for FR1 and subcarrier spacing of 60 or 120 kHZ for FR2), (3)

subcarrier offset between the first subcarrier of SS/PBCH block and the first subcarrier of the resource grid containing the SS/PBCH block kSSB (4 bits), (4) position of the DM-RS corresponding to physical downlink shared channel (PDSCH) (1 bit), (5) parameters related to the physical downlink control channel (PDCCH) and system information block (SIB) (8 bits), (6) a flag showing if the cell is barred or not (a device may not use a barred cell for cell selection/reselection) (1 bit), (7) a flag to allow intra frequency reselection (1 bit), and (8) a spare bit (1 bit).

FIG. 6 illustrates physical broadcast channel (PBCH) coding block diagram according to one or more embodiments. PBCH also contains 1 bit message representing the type of message in PBCH, which can be either MIB or a message Class Extension. Therefore, the size of PBCH message is 24 bits. Once the PBCH message is generated at the higher layers, it is encoded and transmitted on physical channel.

FIG. 6 shows the block diagram of PBCH coding stages 600, in which PBCH message is denoted by vector $\bar{a}$ of length $\bar{A}$=24. In the payload generation stage 605, PBCH message $\bar{a}$ is first extended to length $A=\bar{A}+8$ and then interleaved. Next, the resulting vector a is scrambled to a' of size 32 at scrambling stage 606. Then, the entire vector is used to generate cyclic redundancy check (CRC) parity bits of length 32 at block 607. The resulting CRC is attached to vector a', resulting in vector c of length 64. The vector c is then passed to the channel coding block 608, where polar coding is used to code the message. The output of channel coding block is passed to the rate matching block 609, resulting in vector f of length 864. Then, the vector f is scrambled at block 610, modulated to quadrature phase-shift keying (QPSK) symbols at block 611, and mapped to physical resources at block 612. The scrambling code at this stage depends on the SS/PBCH block index. Therefore, by decoding PBCH message, the exact symbol number can be obtained. The final PBCH sequence $d_{PBCH}$ with length of 432 is transmitted on the symbols allocated to this message, which are shown in FIG. 5.

E. DM-RS for PBCH Sequence Generation

A DM-RS is a reference signal, which is transmitted to the device to provide an estimate of the channel frequency response. In NR, each physical channel has a DM-RS signal, which is used for decoding that specific physical channel, and also providing some system parameters. The DM-RS is transmitted on only specific symbols and subcarriers (not the whole transmission band). A DM-RS for PBCH depends on the half frame containing the SS/PBCH block $n_{hf}$, the number of SS/PBCH block transmission per frame, and the SS/PBCH block index $i_{SSB}$.

II. Receiver Structure

One or more embodiments are directed to a structure of a proposed SDR to opportunistically extract TOA from NR signals. According to one embodiment, a proposed SDR is provided including three main stages: (1) carrier frequency extraction, (2) acquisition, and (3) tracking.

A. Carrier Frequency Extraction

When a device is activated, it first needs to perform a blind search over all possible frequencies in order to find any available SS/PBCH block. In NR, only specified channel raster can carry SS/PBCH blocks, which is called synchronization raster. The center frequency of the synchronization channel raster, which is equivalent to the frequency of the 121th subcarrier of the SS/PBCH block, is denoted by $SS_{ref}$. The value of $SS_{ref}$ is a function of a parameter called global synchronization channel number (GSCN). This function depends on the frequency band of the signal. It is worth mentioning that if a device knows $SS_{ref}$ a priori, it can skip this stage.

B. Acquisition

Figure 7:
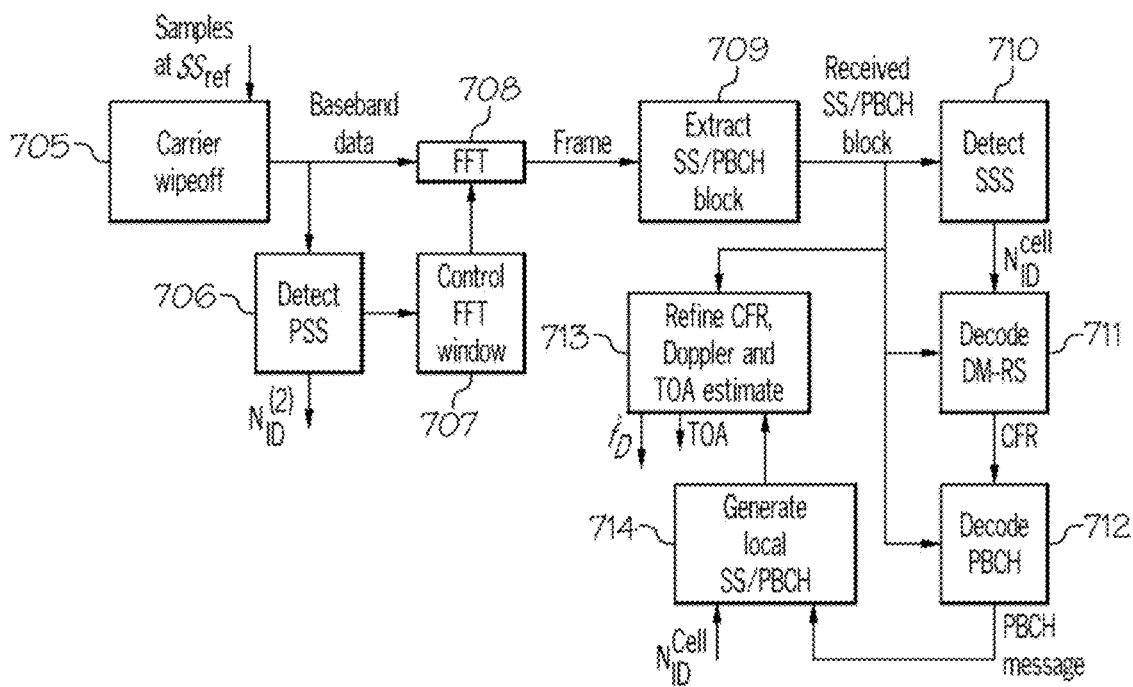
FIG. 7 illustrates acquisition stage operations according to one or more embodiments.

FIG. 7 illustrates acquisition stage operations according to one or more embodiments.

Once the device determines the SS/PBCH block center frequency $SS_{ref}$, it starts sampling at a minimum rate equal to the SS/PBCH transmission bandwidth. Next, it wipes off the carrier frequency at block 705 to convert the samples into the baseband domain. The resulting samples are correlated at block 706 with all the possible PSS sequences and the PSS sequence corresponding to the highest correlation peak determines the $N_{ID}^{(2)}$. The location of the peak of the correlation represents the SS/PBCH symbol start time and can be used to control the FFT window at block 707. Then, the cyclic prefix is removed from the signal and by taking the FFT from the received samples at block 708, the signal is converted into the frame structure. At this stage, the device can extract the SS/PBCH block at block 709. Next, the received SSS signal is correlated with all possible SSS sequences at block 710, and the one corresponding to the highest correlation peak determines the value of $N_{ID}^{(1)}$. Knowing $N_{ID}^{(1)}$ and $N_{ID}^{(2)}$, the device is able to calculate the cell ID $N_{CELL}^{ID}$. The cell ID is used to map the subcarriers allocated to the DM-RS. An exhaustive search must be performed over all possible DM-RS sequences and the one with the highest peak is selected. Once the DM-RS sequence is detected at block 711, it can be used to estimate the channel frequency response (CFR). The next stage is to decode the PBCH message at block 712. For this purpose, the effect of CFR on the received PBCH message is removed using a channel equalizer. Then, the resulting PBCH message is decoded by following the steps in FIG. 6 in reverse order. After obtaining the PBCH message, the device can reconstruct the SS/PBCH block locally at block 714. Then, the resulting code on the second or fourth symbol of the SS/PBCH block is used to estimate the CFR and refine the frame start time, which is called TOA in this disclosure, at block 713. The TOA refinement can be performed using a super resolution algorithm such as estimation of signal parameters via rotational invariant techniques (ESPRIT). The phase difference between the CFR on the second and fourth symbols of the PBCH is used to provide a coarse estimate of Doppler frequency $f_D$.

C. Tracking

Figure 8:
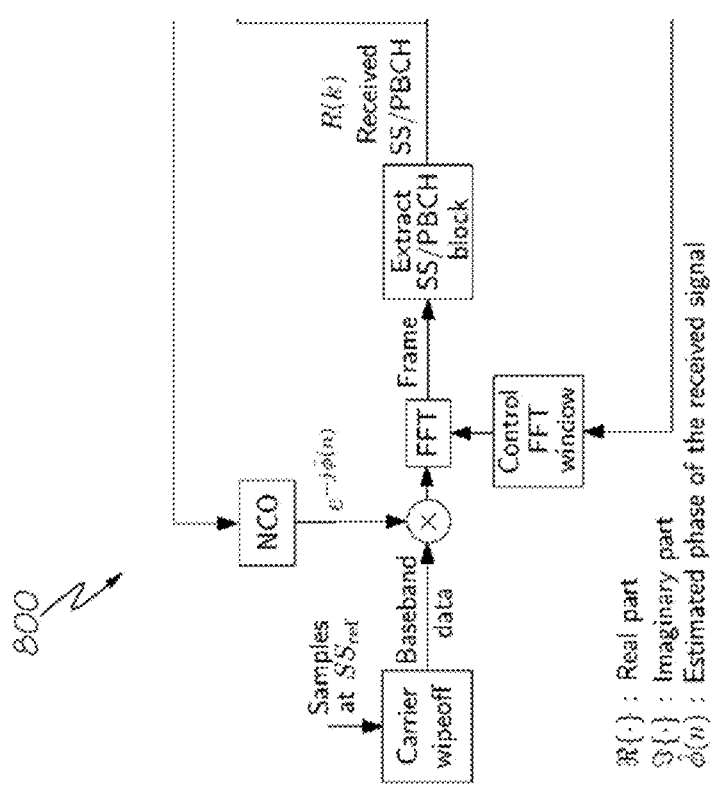
FIG. 8 illustrates tracking stage operations according to one or more embodiments.

FIG. 8 illustrates tracking stage operations according to one or more embodiments.

After obtaining a coarse estimate of the TOA, a tracking loop structure 800 can be used to refine the TOA estimate and keep track of any changes. The tracking loop is composed of a phase-locked loop (PLL)-aided delay-locked loop (DLL). The main components of the PLL and DLL are: a discriminator function, a low-pass filter (LPF), and a numerically-controlled oscillator (NCO).

At each tracking loop iteration, the estimated phase, which is obtained by integrating the Doppler frequency $\hat{f}\_D$ over time, is removed from the baseband signal. Then, the estimated TOA, which is normalized by the sampling time Ts, is divided into a fractional part $0 \leq \text{Frac }\{\cdot\} < 1$ and an integer part Int $\{\cdot\}$. The integer part is used to control the FFT window, while the fractional part is removed from the signal in the frequency domain using a phase rotation. Then, the DLL and PLL are used to estimate the remaining code and carrier phase errors, respectively. It has been shown that the PLL discriminator function can be the phase of the integrated CFRs over the entire subcarriers. An early-powerminus-late-power discriminator function can be used for the DLL discriminator function to derive the normalized timing error Since a shift in the timedomain is equivalent to a phase rotation in the frequency-domain, the locally generated early and late code signals for the OFDM symbol can be obtained respectively as $$S_{early}(k) = e^{-j2\pi\xi k/K} S(k),$$

$$S_{late}(k) = e^{j2\pi\xi k/K} S(k),$$

for k=0, ..., K−1.
where S(k) is the locally generated SS/PBCH symbol at the k-th subcarrier, K=240 is the number of subcarriers allocated to the SS/PBCH block at each symbol, and 0<ξ≤K J is the normalized time shift. The early and late correlations in the frequency-domain can be expressed respectively as $$\mathcal{R}_{early} = \sum_{k=0}^{K-1} R'(k) S^*_{early}(k),$$

$$\mathcal{R}_{late} = \sum_{k=0}^{K-1} R'(k) S^*_{late}(k),$$

where R'(k) is the received signal at the k-th subcarrier after phase shift. The DLL discriminator function is defined as $$D_{DLL} \triangleq |\mathcal{R}_{early}|^2 - |\mathcal{R}_{late}|^2 \triangleq K^2 C \Lambda_{DLL}(\tilde{e}_\tau, \xi) + N_{DLL},$$

where C is the received signal power and $\Lambda_{DLL}(\tilde{e}_\tau, \xi)$ is the normalized S-curve function, defined as $$\Lambda_{DLL}(e_\tau, \xi) \triangleq \left[\frac{\sin(\pi(\tilde{e}_\tau - \xi))}{K\sin(\pi(\tilde{e}_\tau - \xi)/K)}\right]^2 - \left[\frac{\sin(\pi(\tilde{e}_\tau + \xi))}{K\sin(\pi(\tilde{e}_\tau + \xi)/K)}\right]^2,$$

and $N_{DLL}$ represents the noise with zero-mean and variance $$\text{var}[N_{DLL}] \leq$$

$$2K^2\sigma^4 \left[1 + \frac{C}{K\sigma^2}\left(\frac{\sin(\pi(\tilde{e}_\tau - \xi))}{\sin(\pi(\tilde{e}_\tau - \xi)/K)}\right)^2 + \frac{C}{K\sigma^2}\left(\frac{\sin(\pi(\tilde{e}_\tau + \xi))}{\sin(\pi(\tilde{e}_\tau + \xi)/K)}\right)^2\right],$$

where equality holds for ξ=0.5 and $\sigma^2$ is the variance of the received signal's noise. In the following, ξ is set to be 0.5.

The output of the discriminator functions are first normalized by the slope of the discriminator functions at zero error. Then, a loop filter is used to achieve zero steady-state error. It can be assumed that the symbol timing error has linear variations and a second-order loop filter can be used to achieve zero steady-state error. Therefore, a first order LPF can be used with a transfer function given by $$F(s) = 2\zeta\omega_L + \frac{\omega_L^2}{s},$$

where $w_L$ is the undamped natural frequency of the delay loop and ζ is the damping ratio. The damping ratio was set to 1/√2 to have a step response that rises fast enough with little overshoot. Therefore, the noise-equivalent bandwidth is $B_L$=0.53 $w_L$. The loop filter transfer function in is discretized and realized in state-space. The loop update rate was set to two frame duration, i.e., $T_f$=20 ms since SS/PBCH block has periodicity of 20 ms.

Finally, the TOA estimate is updated according to $$\hat{e}_\tau \leftarrow \hat{e}_\tau + \frac{T_f}{T_s}(v_{DLL} - v_{PLL}),$$

where $v_{DLL}$ and $v_{PLL}$ are the outputs of the DLL and PLL filters, respectively.

III. Code Phase Error Statistics

In this section, the SS/PBCH block open-loop code phase error in the absence and presence of multipath is evaluated. A model for channel impulse response (CIR) may be $$\hat{h}(\tau) = \sum_{l=0}^{L-1} \alpha_l \delta(\tau - \eta),$$

where L is the number of multipath components and $\alpha_l$ and $\tau_l$ are the relative attenuation and delay components, respectively, of the CIR's l-th path. The code phase error statistics are evaluated in the absence and presence of multipath, i.e., when L=1 and L 6=1, respectively.

A. Code Phase Error in Multipath-Free Environment

In a multipath-free and noise free environment, the point at which the discriminator function is zero represents the TOA. However, noise can more the zero crossing point as $$\tilde{e}_\tau = \frac{N_{DLL}}{k_{DLL}}, \text{ where }$$

$$k_{DLL} = \frac{\partial D_{DLL}(\tilde{e}_\tau, \xi)}{\partial \tilde{e}_\tau} \bigg|_{\substack{\varepsilon_\tau \approx 0 \\ \xi=1/2}} = \frac{4\pi C \cos\left(\frac{\pi}{2K}\right)}{K\left(\sin\left(\frac{\pi}{2K}\right)\right)^2}.$$

It can be shown that the open-loop code phase error due to noise is a random variable with zero-mean and Variance $$\sigma_{\tilde{e}}^2 \approx \frac{c^2 \pi^2}{128 \Delta f^2 K^3 C/N_0}, \, [m^2]$$

where c is the speed of light, $T_{sub}$=20 ms is the sub-accumulation time interval, and the approximation is obtained by assuming K>>1 and $C/N_o$>>1 db-Hz and defining the double-sided power spectral density of noise as $S_n(f) \triangleq N_0/2$. Note that the carrier-to-noise ratio is defined as $C/N_0 \triangleq C/T_{sub}\sigma^2$, while the signal-to-noise ratio is defined as $SNR \triangleq (C/N_0) \cdot (1/B_n)$, where $B_n$ is the noise equivalent bandwidth.

Figure 9A:
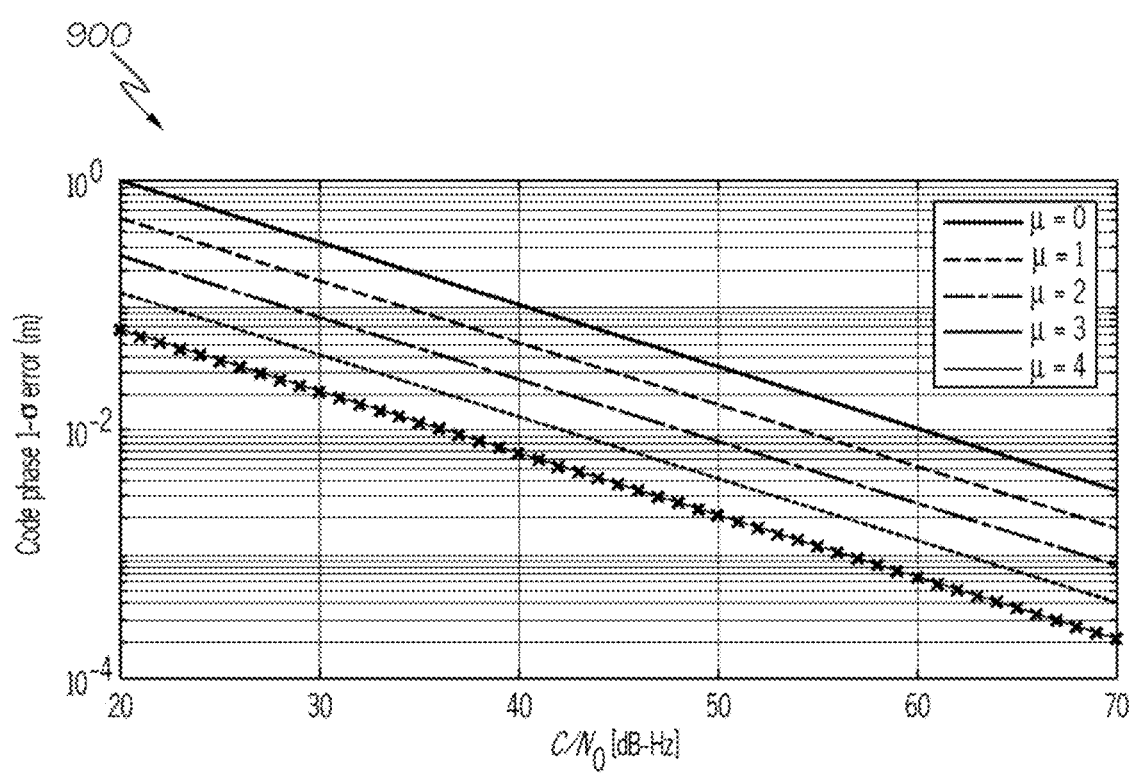
FIG. 9A illustrates a comparison of standard deviation of the code phase error for different values of C/N0 according to one or more embodiments.

FIG. 9A illustrates a comparison of standard deviation of the code phase error for different values of C/N0 and for different numerologies shown as 900. It can be seen that due to the large transmission bandwidth of higher numerologies, the standard deviation of code phase error is an order of magnitude lower compared to lower numerologies.

B. Code Phase Error in a Multipath Environment

In a multipath fading environment, the discriminator function can be expressed as $$D_{DLL} = K^2 C \Lambda_{DLL}(\tilde{e}_\tau, \xi) + N_{DLL} + \chi_1 + \chi_2, \text{ where}$$

-continued $$\chi_1 = \left|\sum_{k=0}^{K-1}\sum_{l=1}^{L-1}\alpha_l e^{-j2\pi(k/K)(\tau_l/T_s-\xi)}\right|^2 - \left|\sum_{k=0}^{K-1}\sum_{l=1}^{L-1}\alpha_l e^{-j2\pi(k/K)(\tau_l/T_s-\xi)}\right|^2,$$

$$\chi_2 = 2\Re\left\{\left[\sum_{k=0}^{K-1}e^{j2\pi(k/K)\xi}\right]\cdot\left[\sum_{k'=0}^{N-1}\sum_{l=1}^{L-1}\alpha^*(l)e^{j2\pi(k'/K)(\tau_l/T_s-\xi)}\right]\right\} -$$

$$2\Re\left\{\left[\sum_{k=0}^{K-1}e^{-j2\pi(k/K)\xi}\right]\cdot\left[\sum_{k'=0}^{K-1}\sum_{l=1}^{L-1}\alpha^*(l)e^{j2\pi(k'/K)(\tau_l/T_s-\xi)}\right]\right\},$$

where $\Re\{\cdot\}$ denotes the real part; $\alpha_0=1$ and $\tau_0=0$; and $\zeta=0.5$. The additional terms x1 and 12, which are caused only by multipath (not noise), introduce a bias in the estimated open-loop code phase error given by $$b = \frac{c\left(\sin\left(\frac{\pi}{2K}\right)\right)^3}{4\pi\Delta f\cos\left(\frac{\pi}{2K}\right)}(\chi_1+\chi_2), \text{ [m]}$$

It can be seen that the open-loop code phase error above not only depends on delays $\alpha_l$ and sampling time, which depends on the numerologies. In the rest of this subsection, the effect of multipath delay is evaluated in FIG. 9B by considering a constant multipath amplitude and increasing the multipath delay for a simplified CIR model. Next, two more realistic CIRs are considered and the statistics of the multipath bias are compared for different numerologies.

Figure 9B:
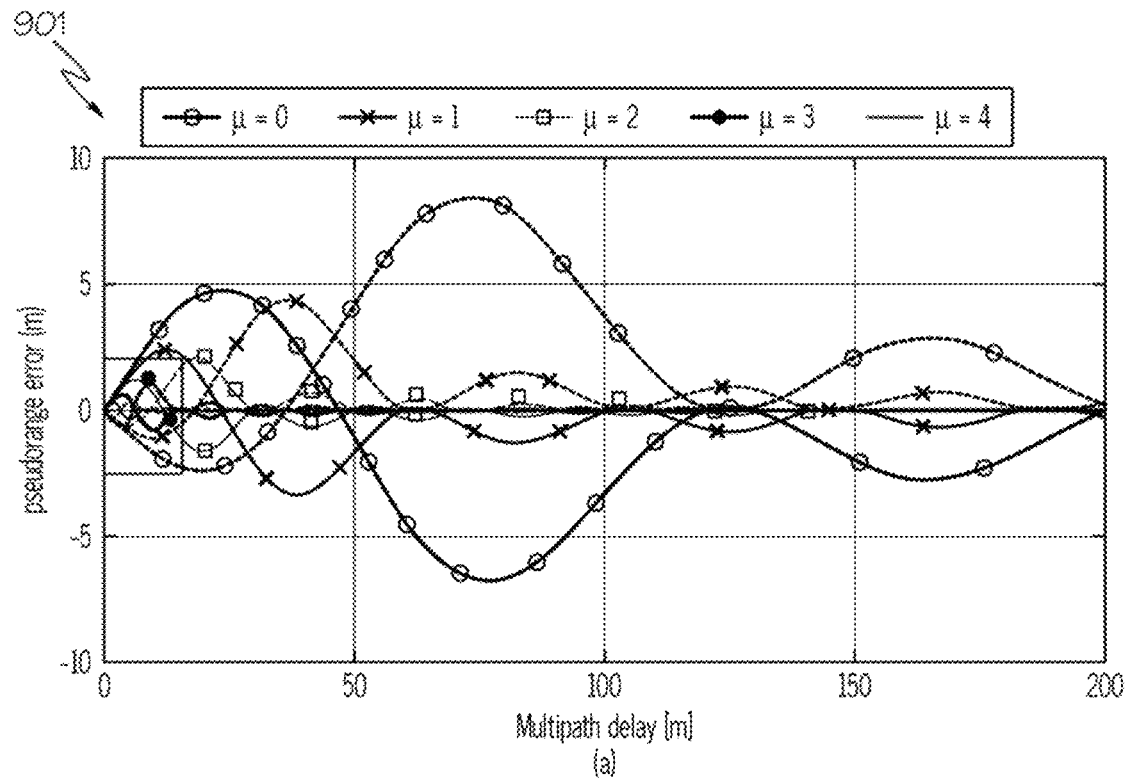
FIG. 9B illustrates effect of multipath delay according to one or more embodiments.
Figure 9B:
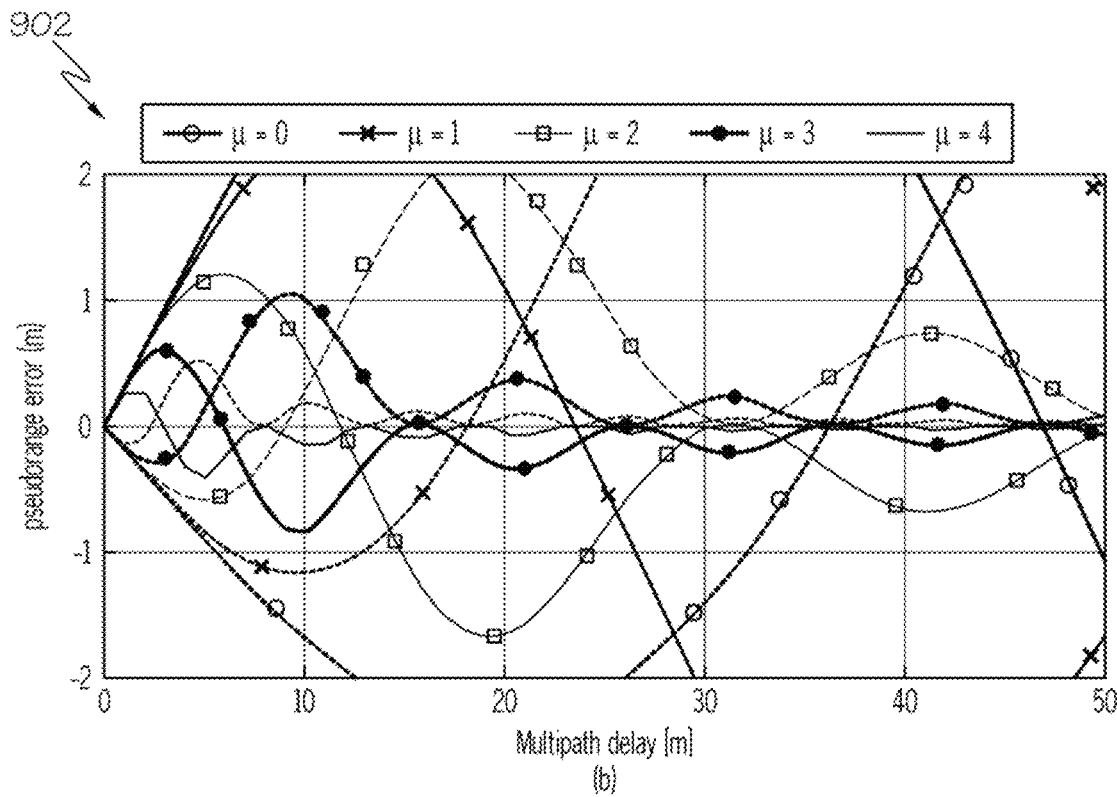

To evaluate the effect of multipath delay on SS/PBCH block ranging error, a channel with only one LOS and one multipath component is considered, where the multipath component has 6 dB lower amplitude than the LOS signal, i.e., $|\alpha_0|=1$ and $|\alpha_1|=0.2512$. FIG. 9B. illustrates the results 901. The solid and dashed lines represent the results for constructive and destructive multipath, respectively, where for constructive multipath 0=1 and 1=0.2512 and for destructive multipath $\alpha_1=1$ and $\alpha_1=0.2152e^{j\pi}$. When multipath delay tends to zero, multipath signal traverses the same path as the LOS signal. Therefore, multipath no longer introduces any bias on the pseudorange. It can be seen that although multipath can cause high error on low numerologies, higher numerologies are more robust to multipath. This is due to the fact that the transmission bandwidth is larger for higher numerologies, which makes it possible to differentiate multipath from LOS. Note that in the presented results in this section, the effect of noise is completely neglected. Therefore, the ranging bias in only due to the multipath effect. A zoomed version is shown as 902 for results 901, since the error is significantly lower for higher numerologies (i.e., µ) compared to the lower ones.

According to embodiments, a proper channel model is essential for evaluating the effect of multipath on the SS/PBCH ranging performance. The existing channel models must be modified to be adopted for mmWaves, since they have different radio propagation characteristics than sub-6 GHz signals. Over the past years, several channel models have been proposed to model radio propagation characteristics of different frequency bands. In this paper, tapped delay line (TDL) 3GPP channel model is used, which is a proper model for simplified evaluations, e.g., non-MIMO evaluations, and is valid for a frequency range between 0.5 GHz and 100 GHz. Among TDL channel models, TDL-A, TDL-B, and TDL-C represent three different channel profiles with non-LOS (NLOS) propagation. In these channels, both the LOS path and multipath follow Rayleigh distribution. Therefore, there is no dominant signal along the LOS path and the LOS signal may or may not exist. These channels model heavily builtup urban environments (e.g., Manhattan, New York, USA). In contrast, TDL-D and TDL-E channel profiles are considered to model a LOS propagation environment, where there is a dominant signal along the LOS path. In these channels, the LOS signal follows a Rician fading distribution and the multipath follows Rayleigh distribution. TDL-D and TDL-E channels represent different environments with K-factors of K1=13.3 dB and K1=22 dB, respectively. Channel delay's taps can have different delay spreads from very short to very long as explained in Table III.

TABLE III

SCALING PARAMETERS FOR TDL CHANNEL MODELS

| Model | Delay Spread [ns] |
|---|---|
| Very short delay spread | 10 |
| Short delay spread | 30 |
| Nominal delay spread | 100 |
| Long delay spread | 300 |
| Very long delay spread | 1000 |

Figure 9C:
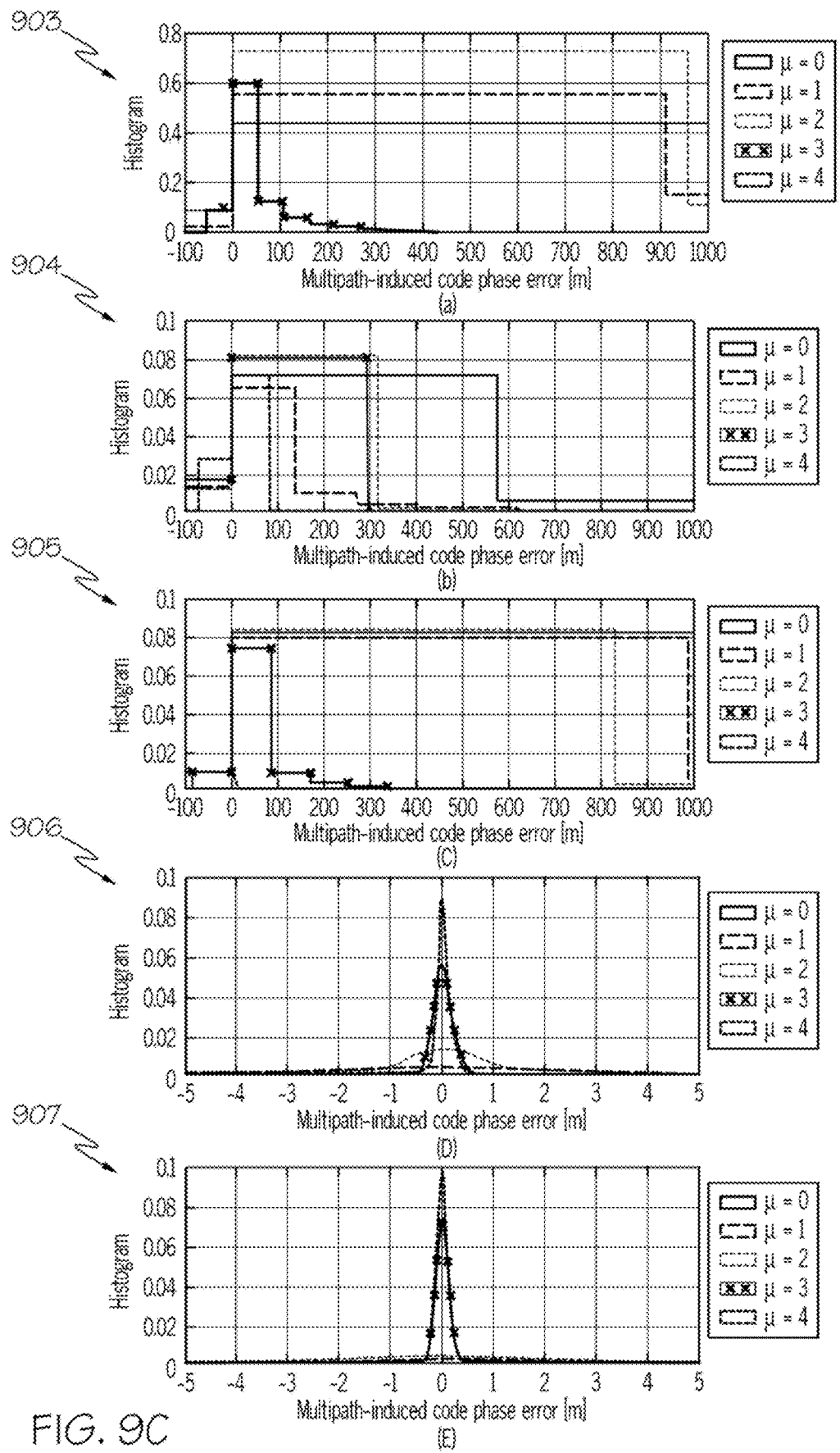
FIG. 9C illustrates histograms of multipath-induced code phase error for different numerologies according to one or more embodiments.

For each channel model, $10^5$ channel taps are randomly generated according to the specified distributions. Then, multipath error is calculated as discussed above in Section III(A). FIG. 9C illustrates a histogram of the code phase error for different numerologies and for different TDL channel profiles with nominal delay spread. FIG. 9C shows histograms of multipath-induced code phase error for different numerologies and for (a) TDL-A shown as 903, (b) TDL-B shown as 904, (c) TDL-C shown as 905, (d) TDL-D shown as 906, and (e) TDL-E shown as 907 channel models with nominal delay spread. Similar figures can be plotted for the rest of the delay spreads. It can be seen that the distribution has slightly heavier tail for positive multipath errors, which is due to the fact that multipath delays are always larger than the LOS delay. By comparing profiles 903, 904, and 905 with profiles 906 and 907m), it can be seen that when LOS is blocked or multipath dominates LOS signal (as in TDL-A, TDL-B, and TDL-C channel profiles), a large bias with nonzero-mean is introduced to the measured pseudoranges.

Figure 9D:
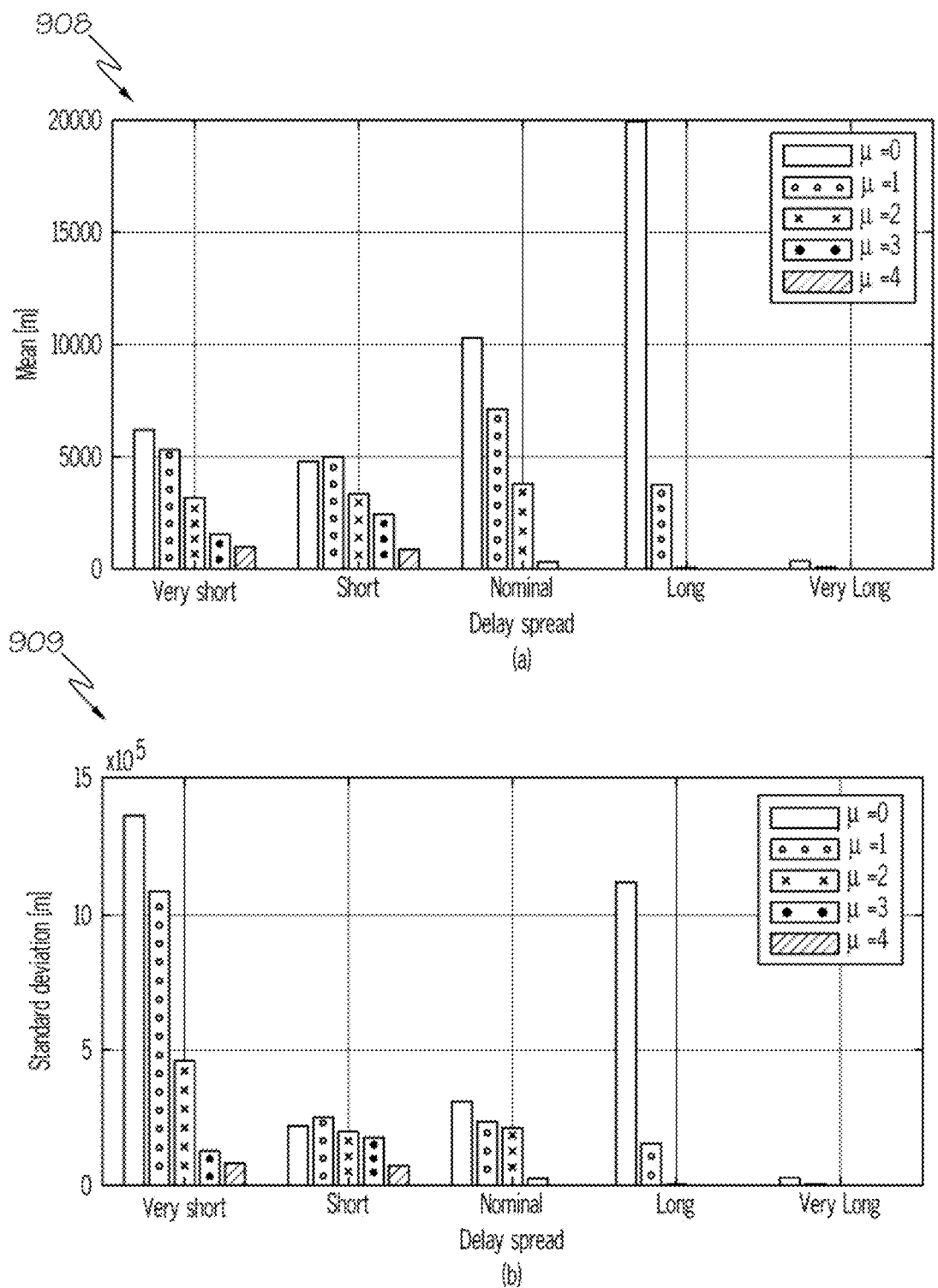
FIG. 9D illustrates mean and standard deviation of the code phase error for different values of delay spread according to one or more embodiments.
Figure 9E:
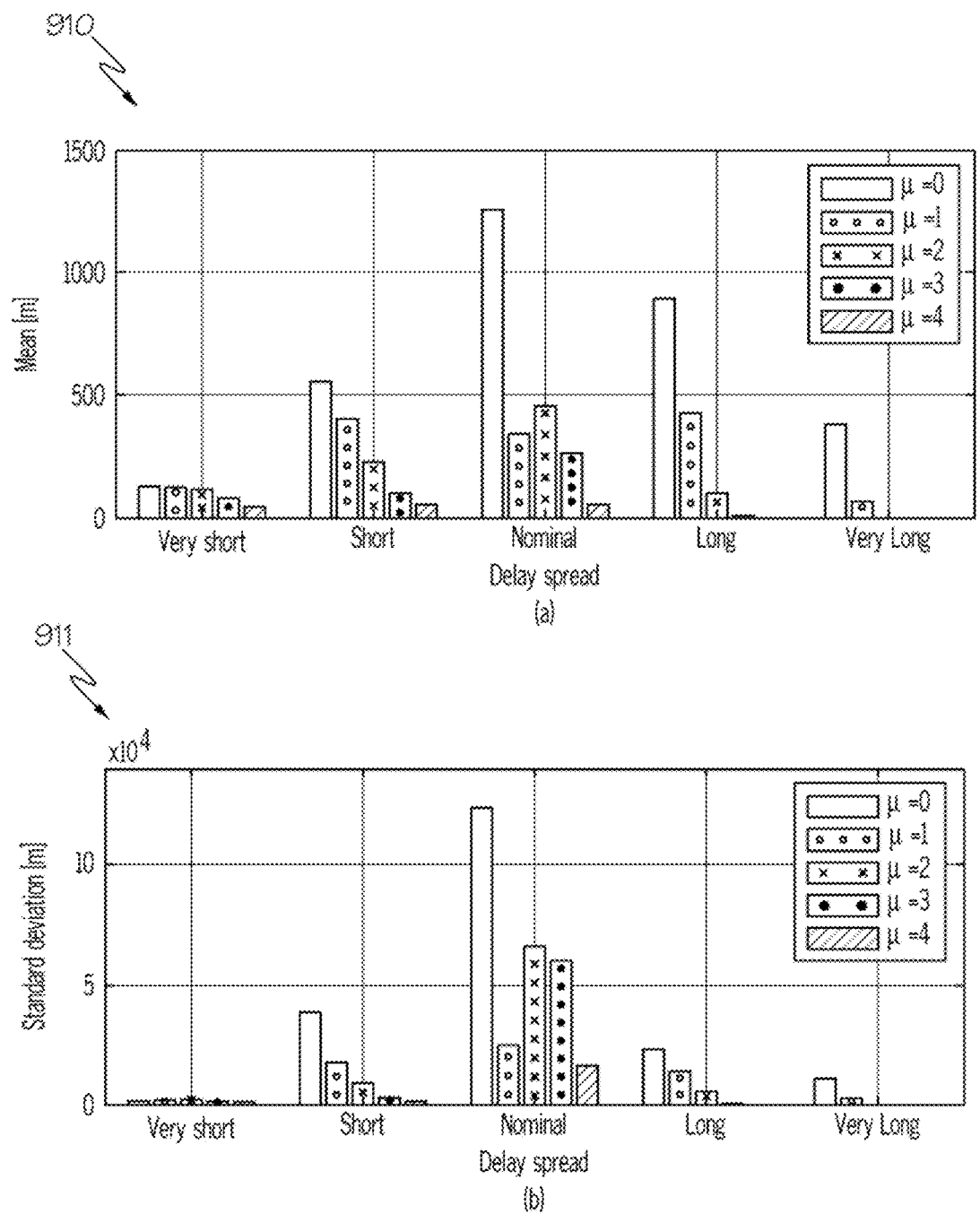
FIG. 9E illustrates mean and standard deviation of the code phase error for different values of delay spread according to one or more embodiments.
Figure 9F:
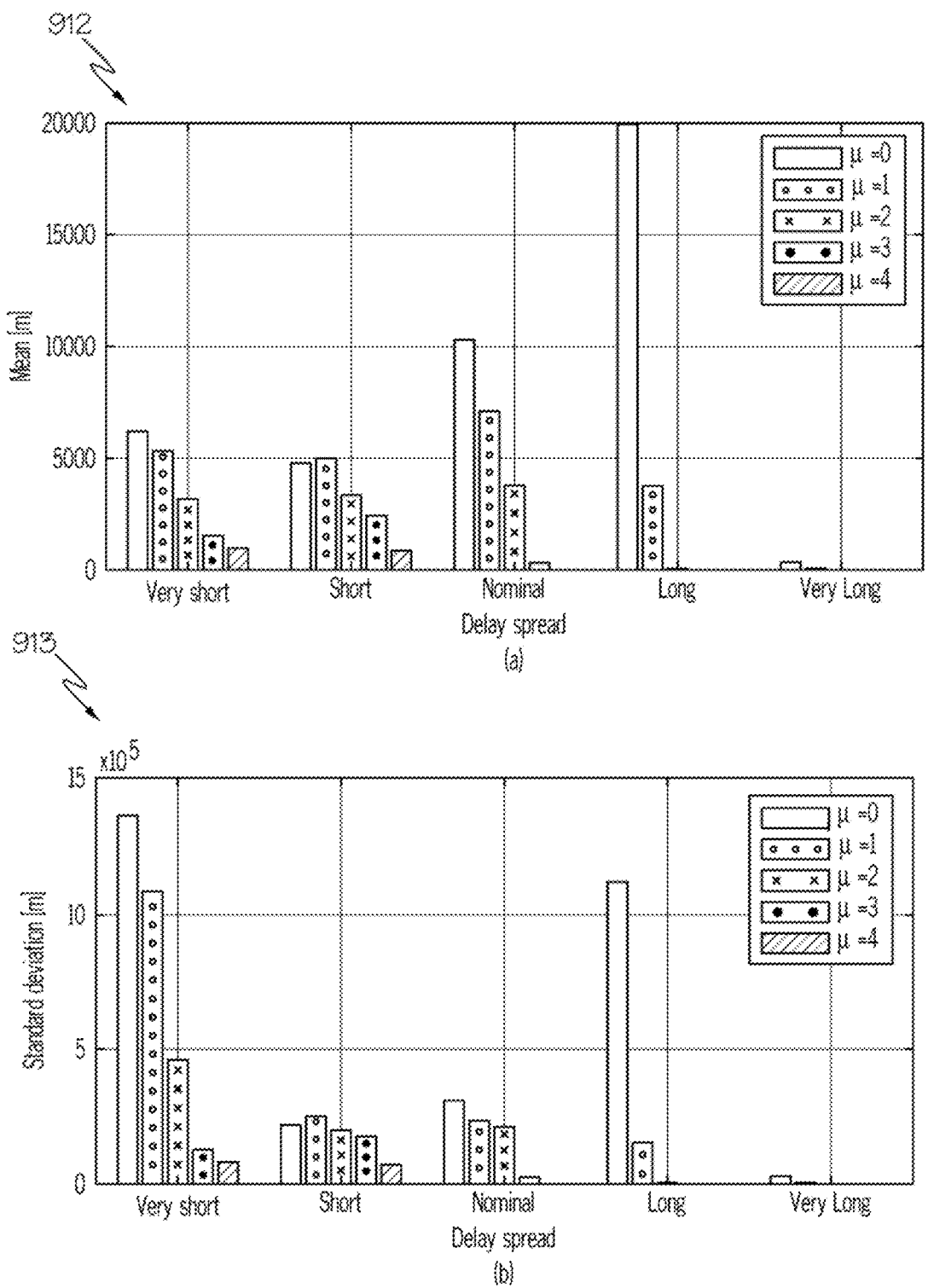
FIG. 9F illustrates mean and standard deviation of the code phase error for different values of delay spread according to one or more embodiments.

FIGS. 9D-9H illustrate the mean and standard deviation of the error for each channel model. FIGS. 9D-9F show that in the NLOS condition, the multipath bias can be significantly large, resulting in large position estimation error. Here, it is imperative to identify and remove the erroneous measurements from the set of measurements to reduce the location estimation error.

Note that in practical scenarios, the NLOS bias is expected to be lower than what is presented in FIGS. 9D-9F. This is due to the fact that the receiver continuously estimates the received carrier-to-noise ratio and it stops tracking the signal when the received carrier-to-noise ratio is low. This condition is not considered in the generated simulation results presented in FIGS. 9D-9F. FIG. 9D shows mean and standard deviation of the code phase error for different values of delay spread for a TDL-A channel model compared to a reference table as 908 and to Table III as 909. FIG. 9E shows mean and standard deviation of the code phase error for different values of delay spread for a TDL-B channel model compared to a reference table as 910 and to Table III as 911. FIG. 9F shows mean and standard deviation of the code phase error for different values of delay spread for a TDL-C channel model compared to a reference table as 912 and to Table III as 913.

Figure 9G:
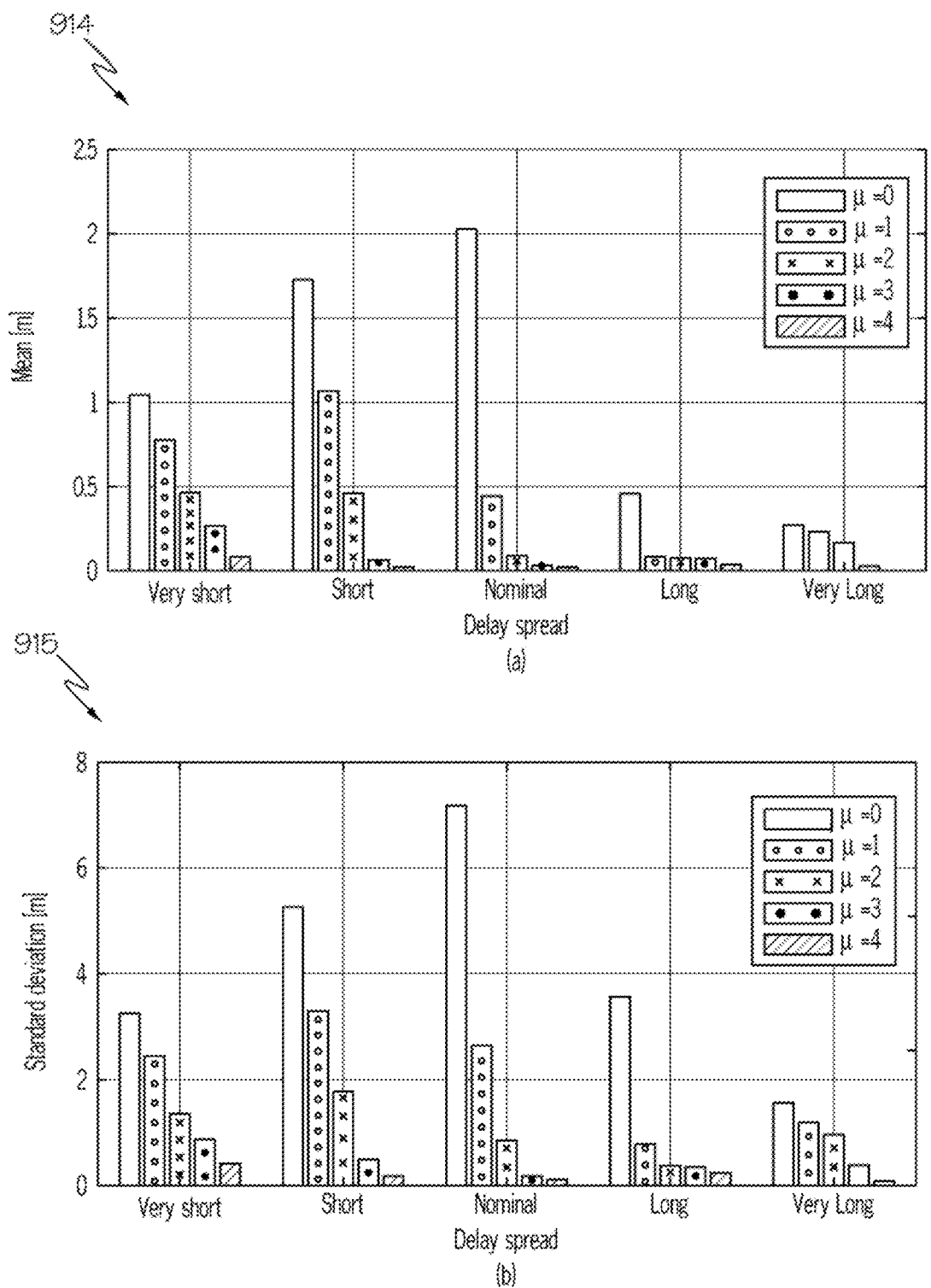
FIG. 9G illustrates mean and standard deviation of the code phase error for different values of delay spread according to one or more embodiments.
Figure 9H:
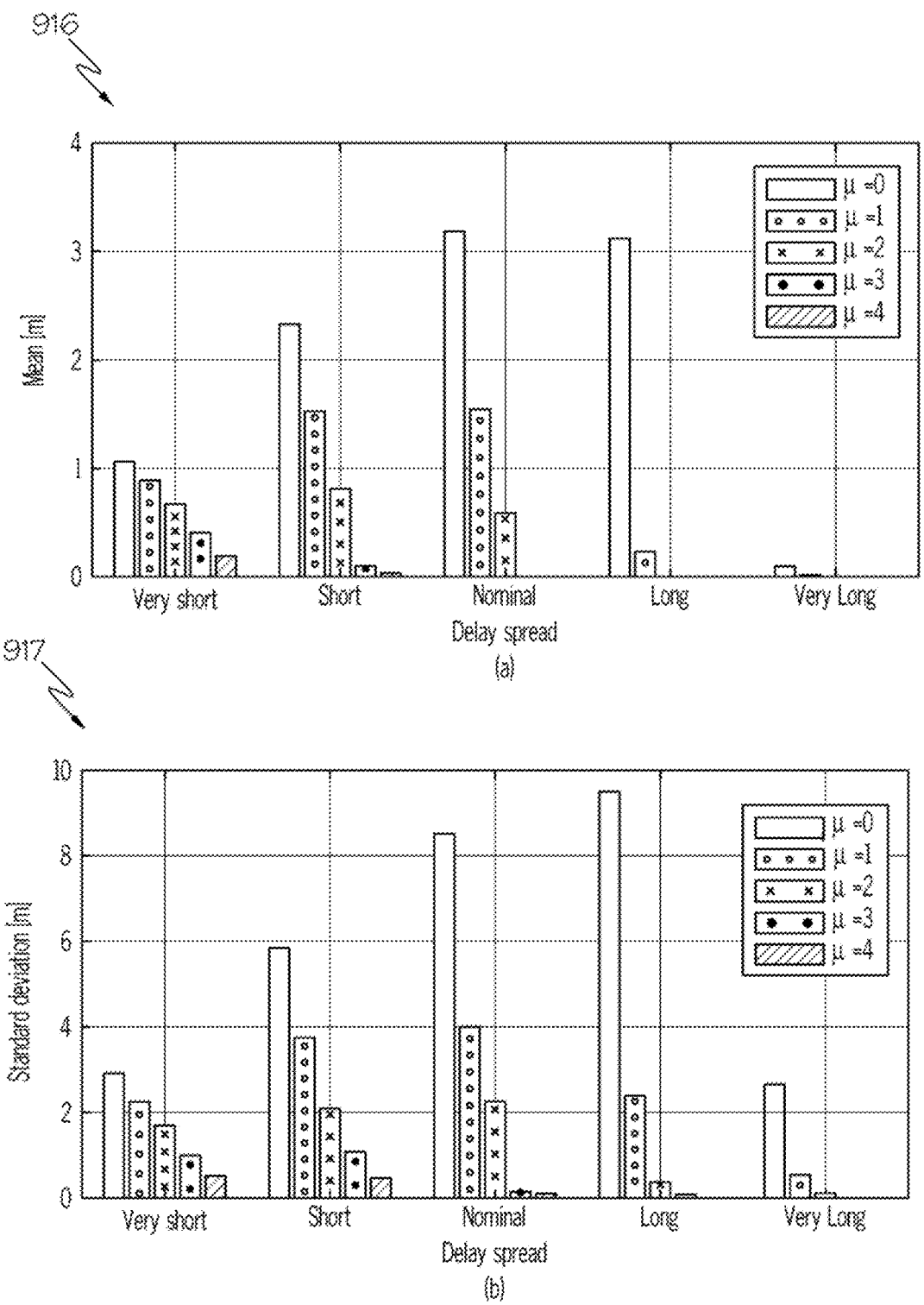
FIG. 9H illustrates mean and standard deviation of the code phase error for different values of delay spread according to one or more embodiments.

FIGS. 9G-9H show that for each channel model, e.g., a TDL-D with short delay spread, increasing subcarrier spacing (i.e., increasing numerologies) reduces the mean and standard deviation of the error. FIG. 9G shows mean and standard deviation of the code phase error for different values of delay spread for a TDL-C channel model compared to a reference table as 914 and to Table III as 915. FIG. 9H shows mean and standard deviation of the code phase error for different values of delay spread for a TDL-C channel model compared to a reference table as 916 and to Table III as 917. This is due to the fact that for larger subcarrier spacing, the SS/PBCH signal bandwidth is larger, which provides higher resolution to differentiate the LOS from multipath. FIGS. 9B and 9G-9H also show that pseudorange error does not decrease monotonically with the multipath delay. This is due to the limited band of the received signal, which causes a sinc autocorrelation function in the time-domain IV. Position Estimation Error Statistics The structure of the proposed SDR to extract navigation observables from NR signals was discussed in Section II describing receiver structure. Then, the achievable ranging precision and the model of multipath error were derived in Section V described in experimental results. In this section, these results are used to derive the statistics of the position estimation error.

A. TOA Measurement Model

Consider a 2-dimensional (2D) network of $U \geq 3$ 5G radio nodes (gNBs), which are distributed independently and uniformly around the device with a binomial point process (BPP) model. Radio nodes (gNBs) as used herein relates to transmitters of communication signals that not transmitted for the purpose of navigation but rather cellular communication. Embodiments are directed to opportunistic navigation and determination of observables using the communication signal. The minimum distance between the device and the gNBs for far-field assumption to hold is assumed to be $d_{min}$. The maximum distance for which ranging signals can be detected by the device is assumed to be $d_{max}$. The location of the u-th radio node (gNB) can be presented by $(d^{(u)}, \phi^{(u)})$, where $$\phi^{(u)} = \arctan\left(\frac{y_s^{(u)} - y_r}{x_s^{(u)} - x_r}\right)$$

$$d^{(u)} = \|r_r - r_s^{(u)}\|_2$$

The device makes TOA measurements to all gNBs. Each TOA measurement contains the distance of the device (UE) to each gNB (i.e., true range), the difference of the clock bias between the UE and the gNB, multipath-induced error, and measurement noise. For simplicity, it is assumed that the gNBs and UE are synchronized and their clock biases do not affect the TOA measurements. By multiplying the estimated TOAs to the speed of light, pseudorange measurements can be obtained Since the effect of multipath and noise on TOA measurements are independent, the covariance matrix of X can be obtained according to $$\rho = d + b + \varepsilon,$$

where p is the vector of pseudo range measurements, d is the vector of ranges, b is the vector of biases cause by multipath, and ε is the measurement noise. Since the effect of multipath and noise on TOA measurements are independent, the covariance matrix of X can be obtained according to $$\Sigma_\rho \triangleq \text{cov}\{\rho\} = \Sigma_\varepsilon + \Sigma_b,$$

where $\Sigma_\varepsilon \triangleq \text{cov}\{e\} = \text{diag}\left[\sigma_r^{(1)^2}, \ldots, \sigma_r^{(U)^2}\right]$ and diag represents diagonal matrix.

Denoting the received carrier-to-noise ratio from the gNB located at distance $d_{min}$ to the UE by C/N0, and using the path-loss model, it can be shown that the carrier-to-noise ratio of the u-th gNB follows $$(C/N_0)^{(u)} = \left(\frac{d_{min}}{d^{(u)}}\right)^\alpha C/N_0,$$

where α is the path-loss exponent, which depends on the propagation environment. Therefore, using results of open-loop code phase error variance the u-th gNB's TOA measurement noise variance can be modeled according to $$\sigma_r^{(u)^2} = \frac{c^2 \pi^2}{128 \Delta f^2 K^3 T_{sub} C/N_0} \left(\frac{d^{(u)}}{d_{min}}\right)^\alpha \quad [\text{m}^2].$$

B. Position Estimation Error Statistics

The device can obtain an estimate of $\Sigma_\varepsilon$ using the correlation function. However, the device does not have any information about the multipath bias on its estimated TOA, since the channel impulse response parameters are not estimated in the DLL. Therefore, b is unknown at the device and is assumed to be zero.

It is assumed that the device employs a weighted nonlinear least squares (WNLS) estimator. Therefore, if b is nonzero, it can be shown that the UE's position estimation error has the following mean and covariance matrix $$\mathbb{E}\{\tilde{r}_r\} = (G^\top \Sigma_\varepsilon^{-1} G)^{-1} G^\top \Sigma_\varepsilon^{-1} b,$$

$$\text{cov}\{\tilde{r}_r\} = (G^\top \Sigma_\varepsilon^{-1} G)^{-1} + (G^\top \Sigma_\varepsilon^{-1} G)^{-1} G^\top \Sigma_\varepsilon^{-1} \Sigma_b \Sigma_\varepsilon^{-1} G (G^\top \Sigma_\varepsilon^{-1} G)^{-1},$$

$$G \triangleq \begin{bmatrix} \cos\phi^{(1)}, \ldots, \cos\phi^{(U)} \\ \sin\phi^{(1)}, \ldots, \sin\phi^{(U)} \end{bmatrix}^\top.$$

Next, the effect of gNBs' locations and multipath error on the statistics of the position estimation error is evaluated. Since deriving a closed-form equation for the statistics of the position estimation error is intractable, the results will be limited to Monte Carlo simulations.

C. Numerical Results

In this section, Monte Carlo simulations are used to numerically analyze the statistics of the position estimation error for TDL-D and TDL-E channel propagation environments. As described herein, nominal delay spread has the highest ranging error. Therefore, the results of this subsection will be only limited to this worst-case scenario. The value of $d_{min}$ was selected to be 10 m, which is significantly larger than the cellular 5G signal's wavelength, so that farfield assumption holds. The value of $d_{max}$=200 m considers mmWave's signal coverage. For each multipath environment, $10^4$ realizations of the channel impulse response and the location of the gNBs are generated and a WNLS is used to solve for the position of the UE. Table IV summarizes the values of the Monte Carlo simulation parameters.

TABLE IV

Monte Carlo Simulation Parameters

| Parameter | Values |
| --- | --- |
| frequency band | mmWave |
| antenna configuration | SISO |
| $C/N_0$ | {50, 60, 70} [dB-Hz] |
| a | 3.7 |
| $d_{min}$ | 10 |
| $d_{max}$ | 200 |
| U | {5, 10, 15} |
| gNBs density | {40, 80, 120} gNBs/km² |

SISO: single-input single-output

Figure 9I:
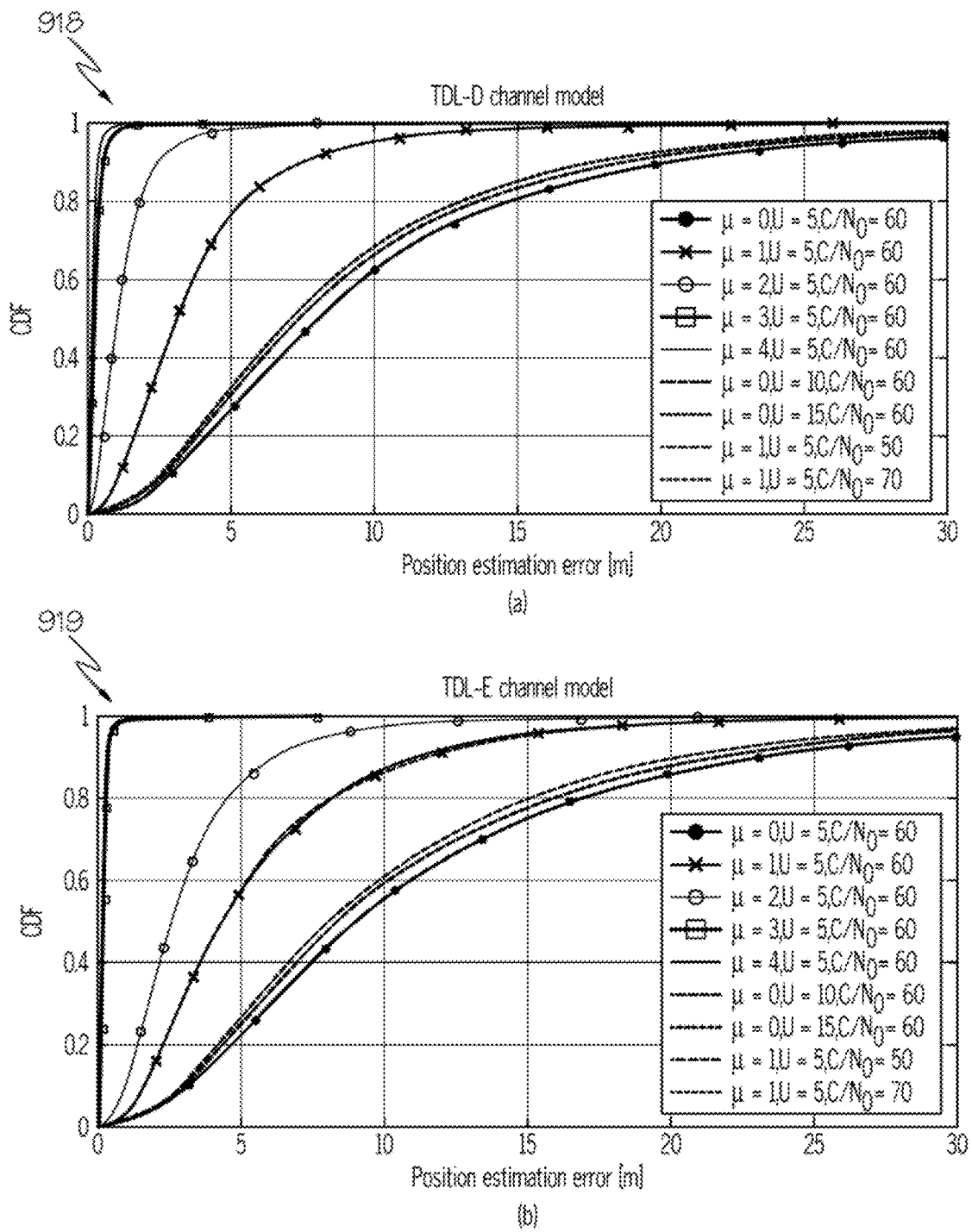
FIG. 9I illustrates resulting cumulative distribution function (CDF) of the position estimation error according to one or more embodiments.

FIG. 9I shows the resulting cumulative distribution function (CDF) of the position estimation error. Table V shows the 95% probability position estimation error bounds for U=5 and µ=0, ..., 4. It can also be seen that increasing the numerologies (i.e., increasing the bandwidth) has the highest effect on the position estimation error, while the effect of the number of gNBs and C/N0 on the error is insignificant compared to the bandwidth. FIG. 9I shows CDF of the position estimation error for TDL-D and TDL-E channel models with nominal delay spread as 918 and 919, respectively.

TABLE V

Position Estimation Error < η [m] with 95% Probability

| µ | $\eta_{TDL-D}$ | $\eta_{TDL-E}$ |
| --- | --- | --- |
| 0 | 26.85 | 29.74 |
| 1 | 9.75 | 13.98 |
| 2 | 3.24 | 8.06 |
| 3 | 0.74 | 0.46 |
| 4 | 0.48 | 0.36 |

Figure 10:
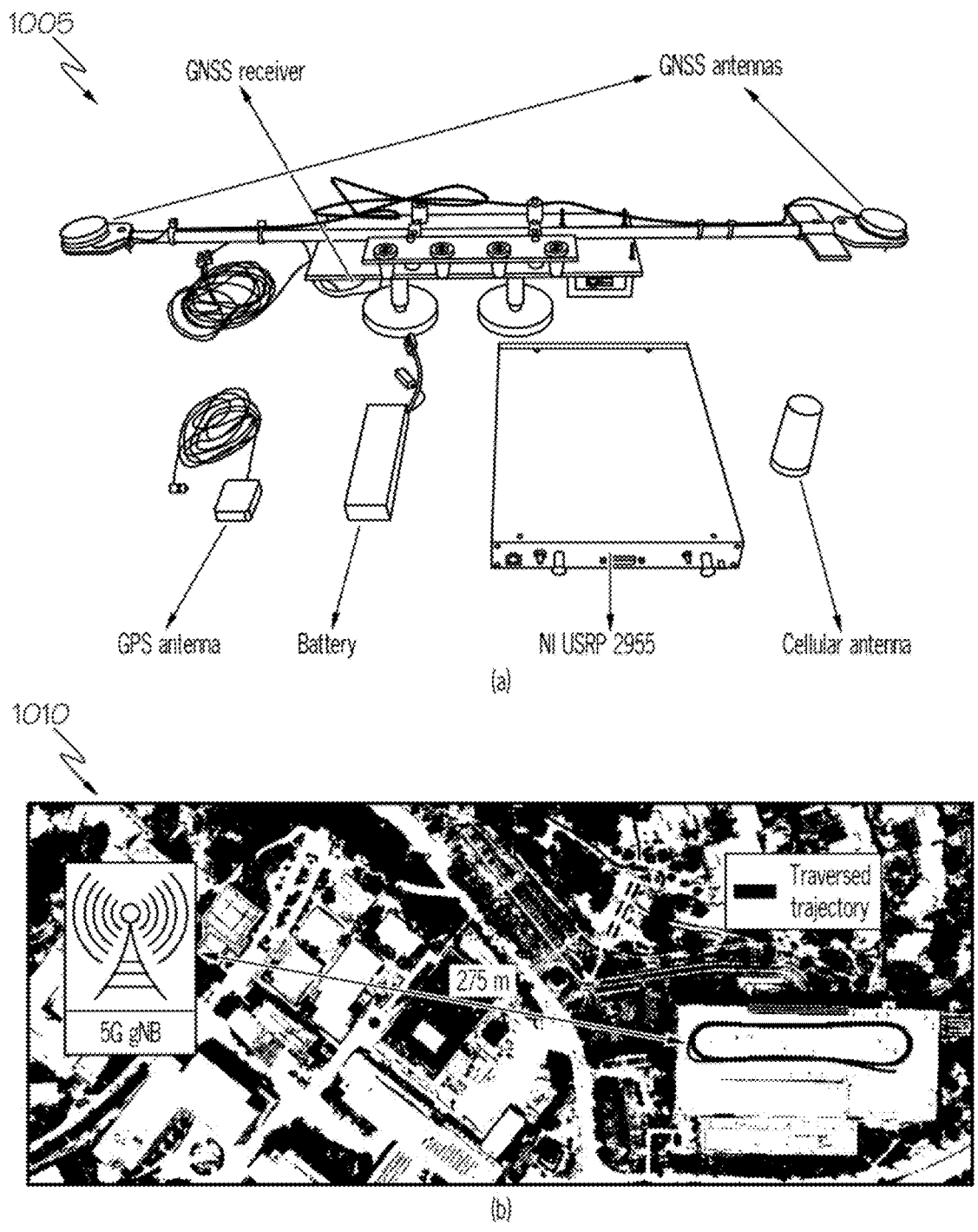
FIG. 10 illustrates an exemplary hardware setup according to one or more embodiments.

FIG. 10 illustrates an exemplary hardware setup according to one or more embodiments. Embodiments are also directed to systems and device configurations to opportunistically extract navigation observables from new radio (NR) signals, such as cellular 5G signals. The configurations are very stable, and do not require communication with the network to navigate with 5G signals compared to conventional processes.

V. Experimental Results

In order to evaluate the proposed receiver, an experiment was performed with real 5G signals in the Anteater parking structure at the University of California, Irvine, USA. In this section, the experimental hardware and software setup are first presented. Then, the experimental results are presented.

A. Experimental Hardware and Software Setup

Since 5G protocol has been finalized very recently, it has not been fully implemented by all operators. Over the course of the experiment, the 5G signal to only one radio node (gNB) was available. Therefore, extracting a position estimate from one pseudorange measurement was infeasible. Experimental results were confined to evaluating the pseudorange measurements.

FIG. 10 shows the experimental hardware setup, the location of the gNB, and the traversed trajectory. System 1005 includes one or more components. In order to perform the experiment, a ground vehicle was equipped with 1 cellular Laird antenna to receive 5G signals at a center frequency of 630.05 MHz, which was obtained by searching over all possible frequency candidates as discussed in Section IV-A. It can be seen that the SS/PBCH block can only accept Case A on band 71, which has 15 kHz subcarrier spacing. Therefore, the SS/PBCH block at this band has 3.6 MHz bandwidth. The cellular antenna was connected to a National Instrument (NI) universal software radio peripheral (USRP)-2955, driven by a GPS-disciplined oscillator (GPSDO) to down-mix and sample 5G signals at 5 MSps. A laptop was used to record the samples using LabVIEW.

The recorded samples were processed with MATLAB offline. A Septentrio AsteRx-i V, which was equipped with dual antenna multi-frequency GNSS receiver with real-time kinematic (RTK) and a Vectornav VN-100 micro electromechanical systems (MEMS) inertial measurement unit (IMU), was used to estimate the position of the ground vehicle, which was used as the "ground truth." The ground vehicle traversed a loop path four times over 135 seconds. The code and carrier loop bandwidth were set to 0.1 and 4 Hz, respectively. Location of the gNBs and the traversed trajectory are shown as 1010.

B. Experimental Results

Figure 11:
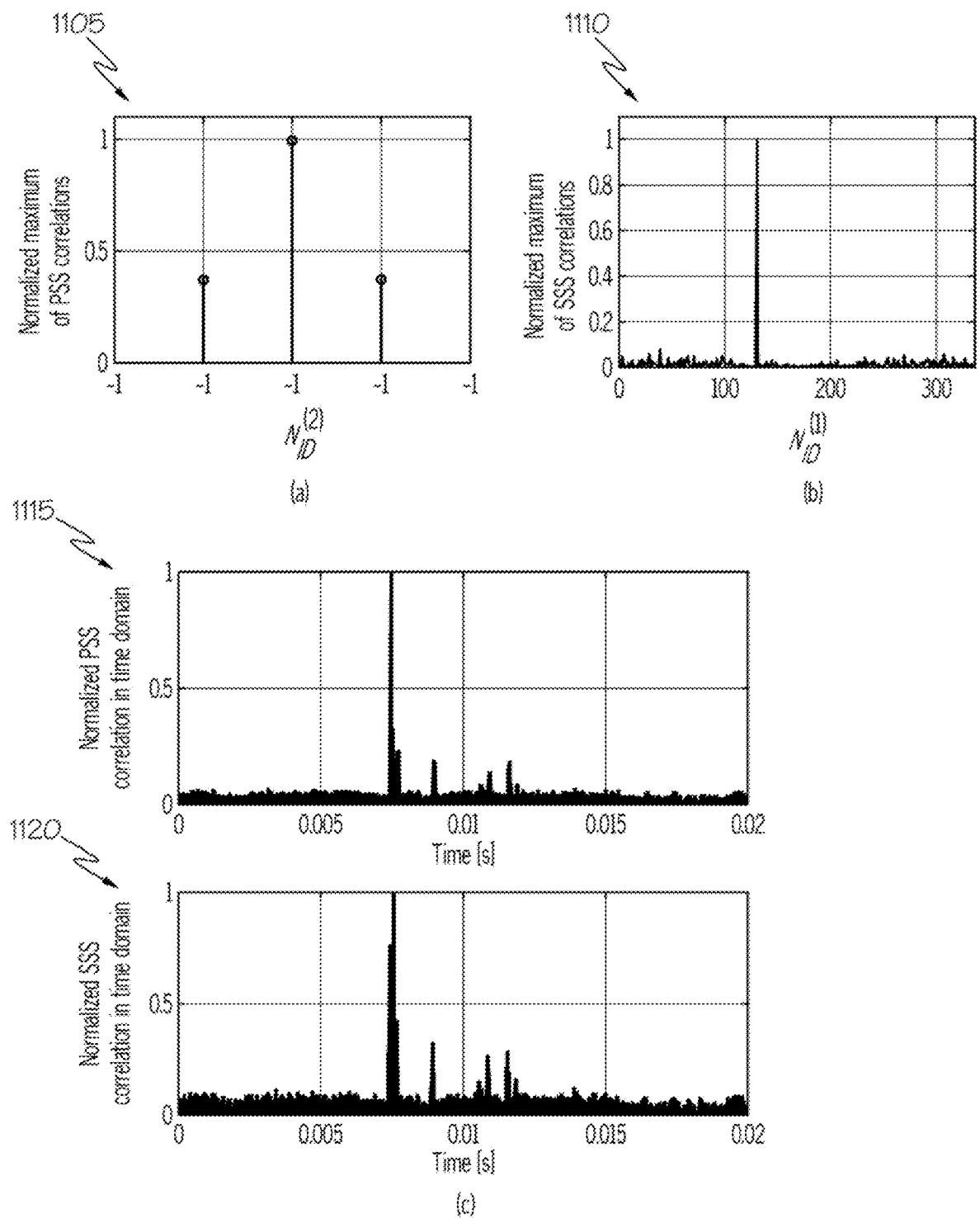
FIG. 11 illustrates PSS and SSS diagrams according to one or more embodiments.

First, the received signal was correlated with all the possible PSS sequences and the one with the highest peak was selected resulting in $N_{ID}^{(2)}$=1. FIG. 11 illustrates PSS and SSS diagrams according to one or more embodiments. The maximum of the PSS correlations are shown as 1105, which is normalized by the highest value, with all possible PSS correlations. Next, the signal was converted to the frame structure and the SS/PBCH block was extracted. Then, the received SSS signal was correlated with all possible SSS sequences and the one with the highest peak was selected resulting in $N_{ID}^{(1)}$=131. The maximum of the SSS correlations are shown as 1110, which is normalized by the highest value, with all possible SSS sequences. The normalized correlation of the received signal with the selected PSS and SSS sequences in time-domain are shown as 1115. Note that as Table II shows, case A contains four SS/PBCH block for carrier frequency below 3 GHz. The small peaks in 1120 show the position of the rest of the SS/PBCH blocks. Correlation of the received signal with the selected PSS and SSS sequence in time domain are shown by 1115 and 1120.

Figure 12:
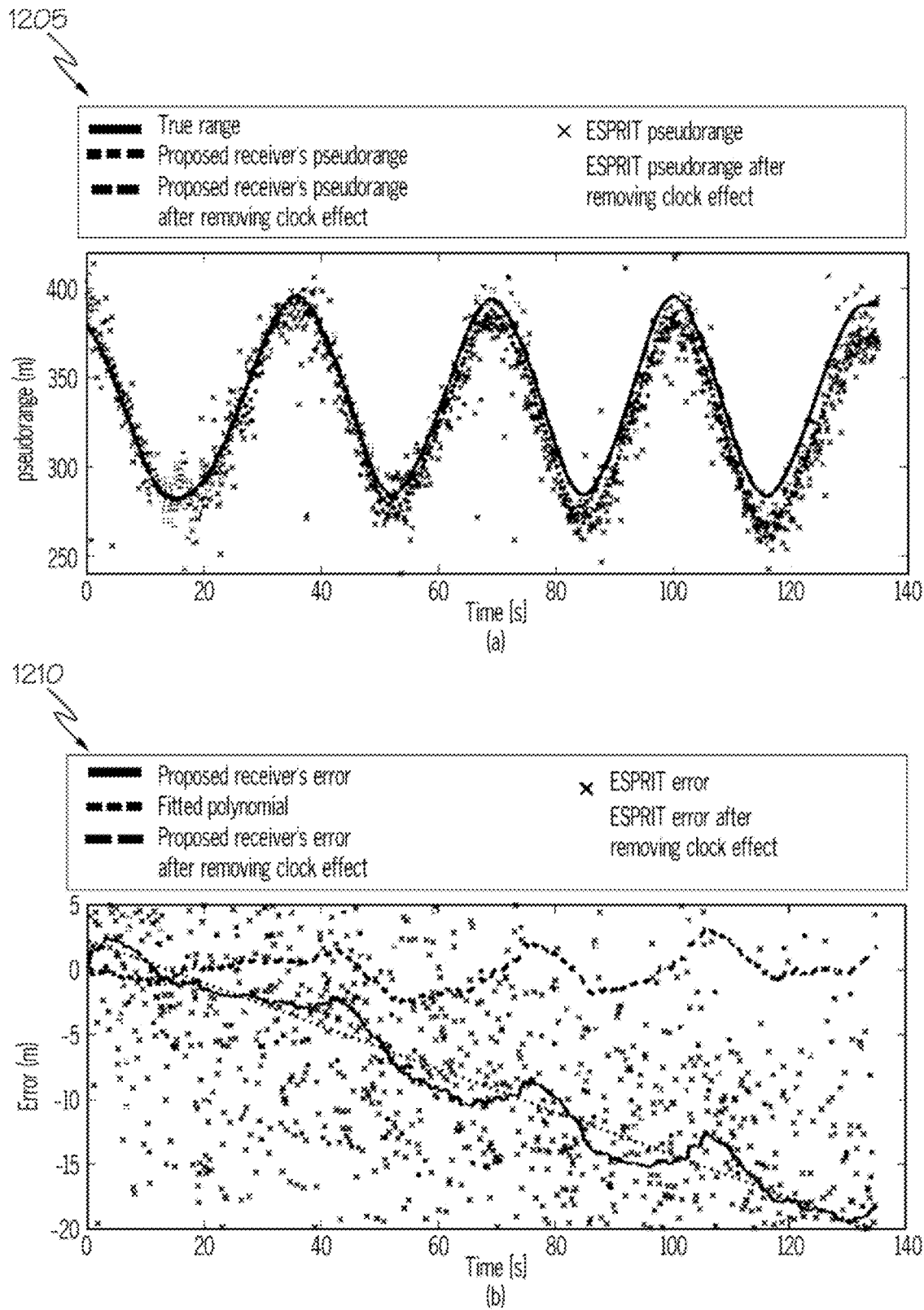
FIG. 12 illustrates range, pseudorange estimations, error and comparisons according to one or more embodiments.

A two-state model, which is composed of a clock bias δt and a clock drift δ̇t, can be used to model the clock dynamics in the estimated pseudorange at time-step k, according to $$\rho(k)=d(k)+c(kT_{sub}\dot{\delta t}(0)+\delta t(0))+\varepsilon(k)$$

where d(k) is the actual range at time-step k and c is the measurement noise. The clock bias was found to be cδ̂t(0) ≈ρ(0)−d(0)=5.37×10⁶ m. FIG. 12 shows actual range, estimated pseudorange with the proposed receiver, and pseudorange after removing clock bias in 1205, and also shows the difference between pseudorange and true range, fitted polynomial to this difference to model clock bias and drift, and remaining error after removing the clock effect as 1210. FIG. 12 shows ρ(k)−cδ̂t(0) in 1205. The actual range d(k) is also plotted and it can be seen that there is a mismatch between ρ(k)−cδ̂t(0) and the actual range d(k), which is shown in 1210. The pseudorange model shows that this mismatch is due to the noise and clock drift (i.e., δ̇t(0)), which increases over time. In the pseudorange model, it is assumed that the clock has a constant drift over time and a first-order polynomial was fitted to estimate this drift. For this purpose, at each timestep, a first-order polynomial was fitted to the difference of the actual range and pseudorange from the initial time-step to the current time-step. The resulting polynomials at each time-step were used to remove the effect of clock bias and drift from the estimated pseudorange at that time-step. The polynomial that was fitted to the difference of actual range and pseudorange over the whole experiment, estimated the clock drift to be $\hat{c}\delta t(0)=-0.16$ m/s. In 1210, FIG. 12 shows the resulting first-order polynomial and the the difference of the pseudorange and range after removing the effect of the clock. The results showed that the estimated range has a standard deviation of 1.19 m. Since the experimental environment was a relatively open area, the received signal had less multipath than the TDL-D and TDLE channel models. Therefore, the resulting standard deviation was less than the results presented in FIGS. 9G-9H. It may be assumed that the pseudorange measurement noise has zero mean.

Note that in practical scenarios, one can use the actual range measurements obtained from a GNSS receiver before the GNSS signal cutoff to estimate the clock bias and drift. Another approach is to estimate the clock bias and drift simultaneously with the position of the UE in an extended Kalman filter (EKF). The remaining error in the pseudorange, after removing the clock bias and drift, is the effect of multipath and noise, which can cause error on the estimated location as discussed herein.

C. Comparison with ESPRIT Algorithm

In this subsection, the performance of the proposed receiver is compared with an ESPRIT algorithm. An ESPRIT algorithm may relate to a super-resolution algorithm that can obtain an estimate of the channel impulse response LOS and multipath delays given the length of the channel. The minimum descriptive length (MDL) criterion is one approach to estimate the length of the channel; but, the MDL method tends to overestimate the channel length. As a result, the ESPRIT TOA estimation has an outlier. In this subsection, the MATLAB function "filloutliers" with linear method was used to reduce this outlier effect on the ESPRIT algorithm's estimated pseudorange. A similar approach to the one presented herein to remove the effect of the clock bias and drift from the ESPRIT algorithm's estimated pseudorange. FIG. 12 illustrates the results of the ESPRIT algorithm's pseudorange before and after removing the clock bias and their corresponding errors. The standard deviation of the ESPRIT algorithm's estimated pseudorange after removing the effect of the clock bias was measured to be 34.42 m, which is significantly higher than the proposed approach standard deviation of 1.19 m.

Embodiments described herein propose an opportunistic framework to exploit 5G signal for navigation and presented the first published experimental results that demonstrate ranging with real 5G signals. For this purpose, first, low-level models of 5G signals and possible reference signals that can be exploited for navigation were presented. Next, an SDR structure was proposed to extract navigation observables from these signals.

Implementing the proposed SDR on an embedded device is practically achievable, but this will require further research and development to optimize the design for size, power consumption, among other engineering considerations. Then, the accuracy of the code phase measurements were analyzed in a multipath free environment and in the presence of multipath. Then, the results were used to derive the statistics of the position estimation error. Simulation results were presented for different channel models. Finally, real 5G signals were used to evaluate the performance of the proposed SDR. The results showed a standard deviation of 1.19 m for the estimated pseudorange using a SS/PBCH signal.

While this disclosure has been particularly shown and described with references to exemplary embodiments thereof, it will be understood by those skilled in the art that various changes in form and details may be made therein without departing from the scope of the claimed embodiments.

What is claimed is:

1. A method for extracting observables from a communications signal, the method comprising:
   receiving, by a device, a communication signal, the communication signal transmitted with a frame structure including a synchronization signal physical broadcast channel block structure (SS/PBCH);
   performing, by the device, a frequency extraction on the received communication signal to determine a carrier frequency of the communication signal;
   acquiring, by the device, an estimation of the channel frequency response and a frame start time by
      removing the carrier frequency of the communication signal to generate samples of the communication signal into a baseband domain,
      converting the samples of the communication signal in a baseband domain to frame structure components, and
      extracting a signal physical broadcast channel block structure (SS/PBCH) from the frame structure components to estimate channel frequency response (CFR) and frame start time of the signal physical broadcast channel block structure (SS/PBCH) in the communication signal;
   performing, by the device, signal tracking to update frame start time of the signal physical broadcast channel block structure (SS/PBCH) in the communication signal; and
   extracting, by the device, at least one observable from the communications signal based on the updated estimate of frame start time of the signal physical broadcast channel block structure (SS/PBCH) in the communication signal.

2. The method of claim 1, wherein the communication signal is based on orthogonal frequency division multiplexing (OFDM) modulation with a cyclic prefix (CP).

3. The method of claim 1, wherein performing frequency extraction includes finding at least one synchronization channel raster frequency associated with a signal physical broadcast channel block structure (SS/PBCH) center frequency.

4. The method of claim 1, wherein acquiring an estimate of channel frequency response includes extraction of a synchronization signal physical broadcast channel block structure from the communications signal.

5. The method of claim 1, wherein the frame structure includes a primary synchronization signal (PSS) to provide symbol timing and a secondary synchronization signal (SSS) to provide frame timing, wherein samples of the communication signal in the baseband are correlated to PSS sequences to determine SS/PBCH symbol start time.

6. The method of claim 1, wherein converting the samples of the communication signal in a baseband domain removes a cyclic prefix (CP) and includes performing a fast Fourier Transform (FFT) to construct OFDM symbols of a frame of the signal.

7. The method of claim 1, wherein estimating channel frequency response (CFR) and frame start time of the signal physical broadcast channel block structure (SS/PBCH) in the communication signal includes using a demodulation reference signal (DM-RS) to estimate the CFR and decoding a physical broadcast channel message of the frame structure.

8. The method of claim 1, wherein signal tracking includes using a tracking loop structure including a phase-locked loop (PLL)-aided delay-locked loop (DLL), the tracking loop structure configured to perform discriminator function, a low-pass filter (LPF), and a numerically-controlled oscillator (NCO).

9. The method of claim 1, wherein signal tracking includes a discriminator function to determine normalized timing error.

10. The method of claim 1, wherein extracting at least one observable from the communications signal includes determining at least one of time of arrival of the communication signal and pseudorange measurement for the device.

11. A device configured for extracting observables from a communications signal, the device comprising
 a communications module configured to receive a communication signal, the communication signal transmitted with a frame structure including a synchronization signal physical broadcast channel block structure (SS/PBCH); and
 a controller, coupled to the communications module, wherein the controller is configured to
  perform a frequency extraction on the received communication signal to determine a carrier frequency of the communication signal;
  acquire an estimation of the channel frequency response and a frame start time by
   removing the carrier frequency of the communication signal to generate samples of the communication signal into a baseband domain,
   converting the samples of the communication signal in a baseband domain to frame structure components, and
   extracting a signal physical broadcast channel block structure (SS/PBCH) from the frame structure components to estimate channel frequency response (CFR) and frame start time of the signal physical broadcast channel block structure (SS/PBCH) in the communication signal;
  perform signal tracking to update frame start time of the signal physical broadcast channel block structure (SS/PBCH) in the communication signal; and
  extract at least one observable from the communications signal based on the updated estimate of frame start time of the signal physical broadcast channel block structure (SS/PBCH) in the communication signal.

12. The device of claim 11, wherein the communication signal is based on orthogonal frequency division multiplexing (OFDM) modulation with a cyclic prefix (CP).

13. The device of claim 11, wherein performing frequency extraction includes finding at least one synchronization channel raster frequency associated with a signal physical broadcast channel block structure (SS/PBCH) center frequency.

14. The device of claim 11, wherein acquiring an estimate of channel frequency response includes extraction of a synchronization signal physical broadcast channel block structure from the communications signal.

15. The device of claim 11, wherein the frame structure includes a primary synchronization signal (PSS) to provide symbol timing and a secondary synchronization signal (SSS) to provide frame timing, wherein samples of the communication signal in the baseband are correlated to PSS sequences to determine SS/PBCH symbol start time.

16. The device of claim 11, wherein converting the samples of the communication signal in a baseband domain removes a cyclic prefix (CP) and includes performing a fast Fourier Transform (FFT) to construct OFDM symbols of a frame of the signal.

17. The device of claim 11, wherein estimating channel frequency response (CFR) and frame start time of the signal physical broadcast channel block structure (SS/PBCH) in the communication signal includes using a demodulation reference signal (DM-RS) to estimate the CFR and decoding a physical broadcast channel message of the frame structure.

18. The device of claim 11, wherein signal tracking includes using a tracking loop structure including a phase-locked loop (PLL)-aided delay-locked loop (DLL), the tracking loop structure configured to perform discriminator function, a low-pass filter (LPF), and a numerically-controlled oscillator (NCO).

19. The device of claim 11, wherein signal tracking includes a discriminator function to determine normalized timing error.

20. The device of claim 11, wherein extracting at least one observable from the communications signal includes determining at least one of time of arrival of the communication signal and pseudorange measurement for the device.

* * * * *